US011997399B1

(12) United States Patent
Can

(10) Patent No.: US 11,997,399 B1
(45) Date of Patent: May 28, 2024

(54) DECOUPLED CAPTURED AND EXTERNAL FRAME RATES FOR AN OBJECT CAMERA

(71) Applicant: Amazon Technologies, Inc., Seattle, WA (US)

(72) Inventor: Ali Can, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/693,916

(22) Filed: Mar. 14, 2022

(51) Int. Cl.
| H04N 23/951 | (2023.01) |
| G06T 3/40 | (2006.01) |
| G06T 7/207 | (2017.01) |
| G06T 7/70 | (2017.01) |
| G06V 10/25 | (2022.01) |
| H04N 23/66 | (2023.01) |

(52) U.S. Cl.
CPC ............ *H04N 23/951* (2023.01); *G06T 3/40* (2013.01); *G06T 7/207* (2017.01); *G06T 7/70* (2017.01); *G06V 10/25* (2022.01); *H04N 23/66* (2023.01)

(58) Field of Classification Search
CPC ........ H04N 23/951; H04N 23/66; G06T 3/40; G06T 7/207; G06T 7/70; G06V 10/25
USPC ...................................................... 348/207.1
See application file for complete search history.

(56) References Cited

U.S. PATENT DOCUMENTS

| 6,296,187 | B1 | 10/2001 | Shearer |
| 6,784,927 | B1 * | 8/2004 | Itokawa ............. H04N 23/6811 |
| | | | 348/208.1 |
| 7,031,016 | B1 | 4/2006 | Ohwa |
| 7,050,994 | B1 | 5/2006 | McIntyre et al. |
| 10,491,963 | B1 | 11/2019 | Waggoner et al. |
| 11,095,924 | B1 | 8/2021 | Chee et al. |
| 2002/0171743 | A1 | 11/2002 | Kimizuka |
| 2003/0112347 | A1 | 6/2003 | Wyman |
| 2004/0075750 | A1 | 4/2004 | Bateman |
| 2004/0145660 | A1 | 7/2004 | Kusaka |
| 2009/0164561 | A1 * | 6/2009 | Ono ................... H04N 1/00156 |
| | | | 715/243 |

(Continued)

OTHER PUBLICATIONS

U.S. Appl. No. 17/693,853; Non-Final Office Action; dated Dec. 28, 2022; 7 pages.

(Continued)

*Primary Examiner* — Usman A Khan
(74) *Attorney, Agent, or Firm* — BakerHostetler

(57) ABSTRACT

A camera device may capture a high-resolution image of a frame and store the high-resolution image in memory. The camera device may down-sample the high-resolution image to a low-resolution image of the frame. The camera device may transmit, to an external compute node, the low-resolution image. The camera device may receive, from the external compute node, a request for a region of interest from the high-resolution image. The camera device may transmit, to the external compute node, the region of interest from the high-resolution image. The camera device may have a captured frame rate at which high-resolution images are captured. The camera device may also have an external frame rate based upon which all, or only some, of the high-resolution images may be down-sampled to low-resolution images that are transmitted to the external compute node. The external frame rate may be decoupled from the captured frame rate.

20 Claims, 15 Drawing Sheets

(56) References Cited

U.S. PATENT DOCUMENTS

| | | | |
|---|---|---|---|
| 2010/0183277 A1* | 7/2010 | Okada | H04N 23/611 |
| | | | 386/271 |
| 2010/0299021 A1 | 11/2010 | Jalili | |
| 2011/0216179 A1 | 9/2011 | Dialameh et al. | |
| 2012/0081558 A1* | 4/2012 | Ogura | H04N 23/683 |
| | | | 348/208.6 |
| 2015/0144693 A1 | 5/2015 | Li et al. | |
| 2017/0032311 A1 | 2/2017 | Rizzolo et al. | |
| 2017/0034410 A1* | 2/2017 | Yoo | H04N 23/632 |
| 2017/0054948 A1 | 2/2017 | Angel et al. | |
| 2017/0208315 A1* | 7/2017 | Rajak | H04N 13/161 |
| 2018/0215344 A1 | 8/2018 | Santora et al. | |
| 2018/0331833 A1 | 11/2018 | Tomlinson et al. | |
| 2019/0130671 A1 | 5/2019 | Dillow et al. | |
| 2019/0141323 A1 | 5/2019 | Yang et al. | |
| 2019/0158777 A1 | 5/2019 | Mann et al. | |
| 2019/0387153 A1 | 12/2019 | De Mers et al. | |
| 2019/0394626 A1 | 12/2019 | Hitotsumatsu et al. | |
| 2020/0216026 A1 | 7/2020 | Price et al. | |
| 2021/0266458 A1 | 8/2021 | Nayak et al. | |
| 2021/0297929 A1 | 9/2021 | Frusina et al. | |
| 2021/0319238 A1 | 10/2021 | Bono et al. | |
| 2022/0019810 A1 | 1/2022 | Farber et al. | |
| 2022/0113421 A1 | 4/2022 | Xu et al. | |
| 2022/0180084 A1 | 6/2022 | Simpson | |
| 2022/0198827 A1 | 6/2022 | Stawiszynski et al. | |
| 2022/0303445 A1 | 9/2022 | Skaff et al. | |
| 2022/0335663 A1 | 10/2022 | Hill et al. | |
| 2022/0413118 A1 | 12/2022 | Starr et al. | |
| 2022/0413119 A1 | 12/2022 | Starr et al. | |
| 2023/0054256 A1 | 2/2023 | Jongsma et al. | |

OTHER PUBLICATIONS

U.S. Appl. No. 17/693,853; Final Office Action; dated Apr. 5, 2023; 8 pages.

U.S. Appl. No. 17/693,853; Non-Final Office Action; dated Mar. 12, 2024; 9 pages.

* cited by examiner

1210 Capture a high-resolution image of a frame, wherein the high-resolution image has a first resolution

1212 Store the high-resolution image in an onboard memory (e.g., circular storage buffer) of the camera device

1214 Down-sample the high-resolution image to a low-resolution image of the frame, wherein the low-resolution image has a second resolution that is lower than the first resolution

1216 Transmit, to an external compute node that is external to the camera device, the low-resolution image

1218 Receive, from the external compute node, a request for a region of interest from the high-resolution image

1220 Obtain the region of interest from the high-resolution image

1222 Transmit, to the external compute node, the region of interest from the high-resolution image

FIG. 12

DECOUPLED CAPTURED AND EXTERNAL FRAME RATES FOR AN OBJECT CAMERA

CROSS-REFERENCE TO RELATED APPLICATIONS

This application is related to the following application: U.S. patent application Ser. No. 17/693,853 filed Mar. 14, 2022, entitled "OBJECT CAMERA".

BACKGROUND

Computer vision cameras may include standard cameras and smart cameras. Standard cameras may generally have limited, if any, onboard memory resources and onboard processing resources. By contrast, smart cameras may generally provide greater amounts of onboard memory and processing resources than standard cameras. Many smart cameras are designed for specific applications and are priced at higher rates than standard cameras. Additionally, the image resolution provided by smart camera image sensors may generally be lower than standard camera image sensors. Many computer vision applications include an object detection operation followed by an additional processing operation. For example, an object detection operation may include detection of an object of interest, such as a machine-readable data object (e.g., barcode, fiducial tag, etc.), a person's face, a license plate, and many others. The additional processing operation may include an additional operation that may be performed on a detected object of interest, such as reading of a machine-readable data object (e.g., to identify a product, location, etc.), recognizing a person's face and identity, reading and identifying a license plate number, and many others.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 12 is a flowchart illustrating an example object camera image transmission process that may be used in accordance with the present disclosure.

DETAILED DESCRIPTION

Figure 1:
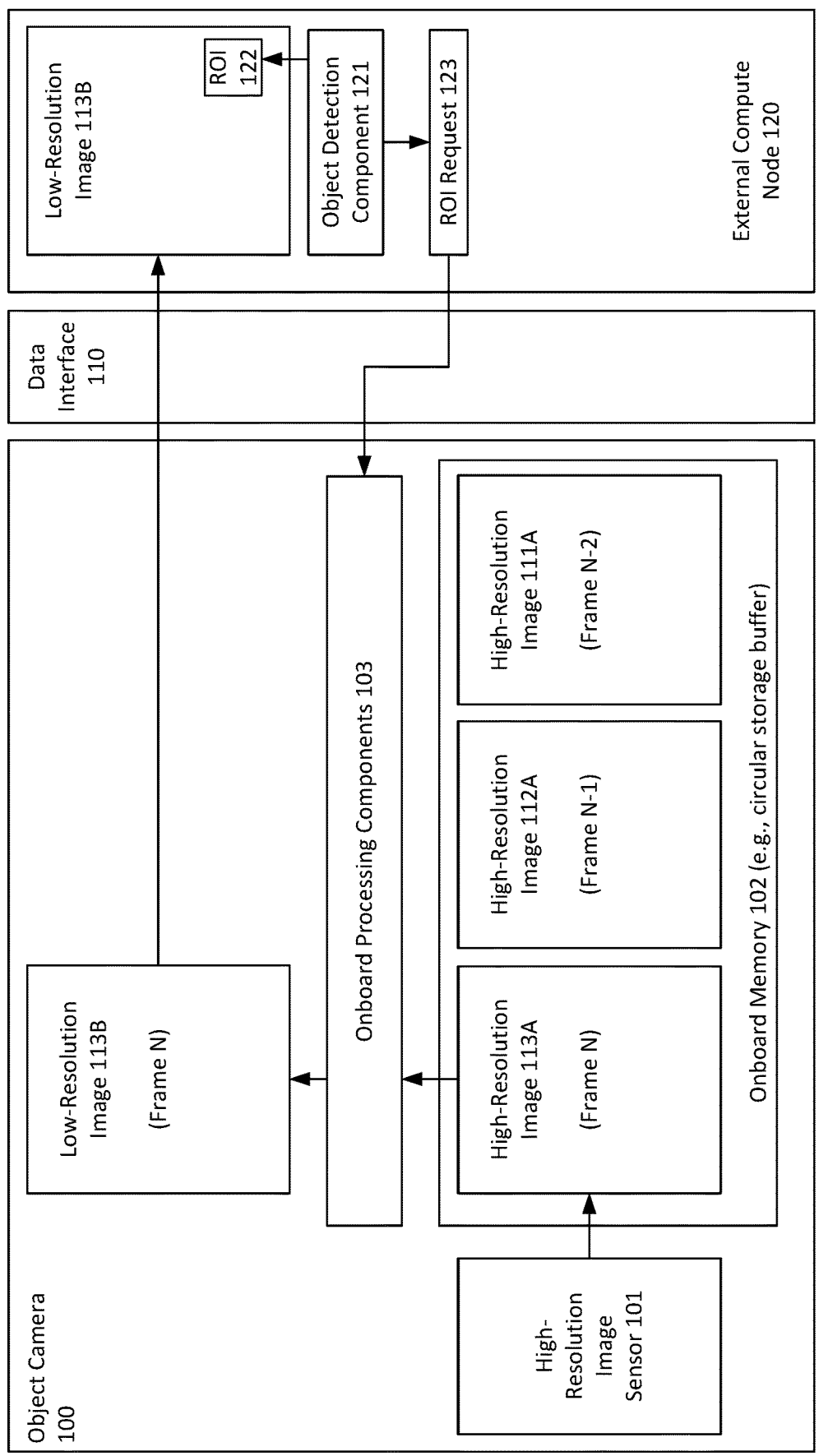
FIG. 1 is a diagram illustrating example object camera and external compute node interactions related to a region of interest request that may be used in accordance with the present disclosure.

Techniques for implementation of an object camera device are described herein. Generally, the object camera may assist in filling the gap between standard cameras and smart cameras. Specifically, the object camera may include a high-resolution image sensor that captures images, corresponding to image frames, at a high-resolution. Additionally, the object camera may include onboard memory resources, such as a circular storage buffer, for storing the high-resolution images. Furthermore, the object camera may include onboard processing resources that down-sample a high-resolution image of a frame to a corresponding low-resolution image of the same frame. The low-resolution image may then be transmitted to an external compute node that is external to the object camera. The external compute node may then perform an object detection analysis on the low-resolution image to detect an object of interest, such as a machine-readable data object (e.g., barcode, fiducial tag, etc.), a person's face, a license plate, and many others. The external compute node may then determine a region of interest, which is a portion of the frame that includes at least part of one or more objects of interest.

Upon determining the region of interest, the external compute node may request, from the object camera, the region of interest from the high-resolution image. Upon receipt of this request, the object camera may obtain the region of interest from the high-resolution image, and the object camera may send the high-resolution region of interest to the external compute node. Upon receipt of the high-resolution region of interest, the external compute node may perform additional processing operations on the high-resolution region of interest, such as such as reading of a machine-readable data object, recognizing a person's face and identity, reading and identifying a license plate number, and many others. For example, a detected identifier may be read to identify and/or classify one or more products or other items in the image, to identify a location of a camera (e.g., for autonomous vehicle-based or other moving cameras), and for many other reasons.

It is noted that the image resolution that is required to perform object detection may often be lower than the image resolution that is required to perform additional processing operations on the detected object. For example, the image resolution that is required to detect a presence of a barcode or fiducial tag in an image may often be lower than the image resolution that is required to read the detected barcode or fiducial tag. Thus, by down-sampling the frame and sending the low-resolution image to the external compute node, the object camera allows the external compute node to perform object detection on the frame while also reducing the network traffic on the network interface between the object camera and the external compute node (e.g., as compared to sending the entire high-resolution version of the image). This may be particularly advantageous in scenarios when there are large quantities of image data being sent to the external compute node, such as scenarios in which multiple cameras are concurrently sending images to the external compute node for processing. For example, in some cases, multiple cameras may be used to capture images of an area from different locations, angles, orientations, etc. Thus, the techniques described herein may increase the number of cameras that can connect to an external compute node.

Additionally, the techniques described herein may provide other advantages. For example, by performing image down-sampling, high-resolution image storing and optionally other operations (e.g., geometric transformations, etc.) on the camera, the computations that are performed on the external compute node may be reduced, thereby reducing processing latency at the external compute node. Furthermore, graphics processing unit (GPU) and central processing unit (CPU) capability on the external compute node can be utilized more cost effectively across a network of lower cost object cameras. Therefore, the need for onboard computation on the camera that can support deep learning (DL) network computations, such as for object detection algorithms, may be reduced or eliminated. Smart cameras may become particularly expensive at high-resolutions, and they may often not be up to date with new sensors.

FIG. 1 is a diagram illustrating example object camera and external compute node interactions related to a region of interest request that may be used in accordance with the present disclosure. As shown in FIG. 1, object camera 100, which is a camera device, may communicate with external compute node 120 via a data interface 110. The external compute node 120 is external to the object camera 100, meaning that the external compute node 120 is not included in the object camera 100. In some examples, a plurality of object cameras, such as including object camera 100 and one or more other object cameras (not shown in FIG. 1), may communicate with external compute node 120 via data interface 110. For example, in some cases, multiple cameras may be used to capture images of an area from different locations, angles, orientations, etc. In some examples, the data interface 110 may include one or more wired and/or wireless network connections between the object camera 100 (and optionally any number of other object cameras) and the external compute node 120.

Figure 2:
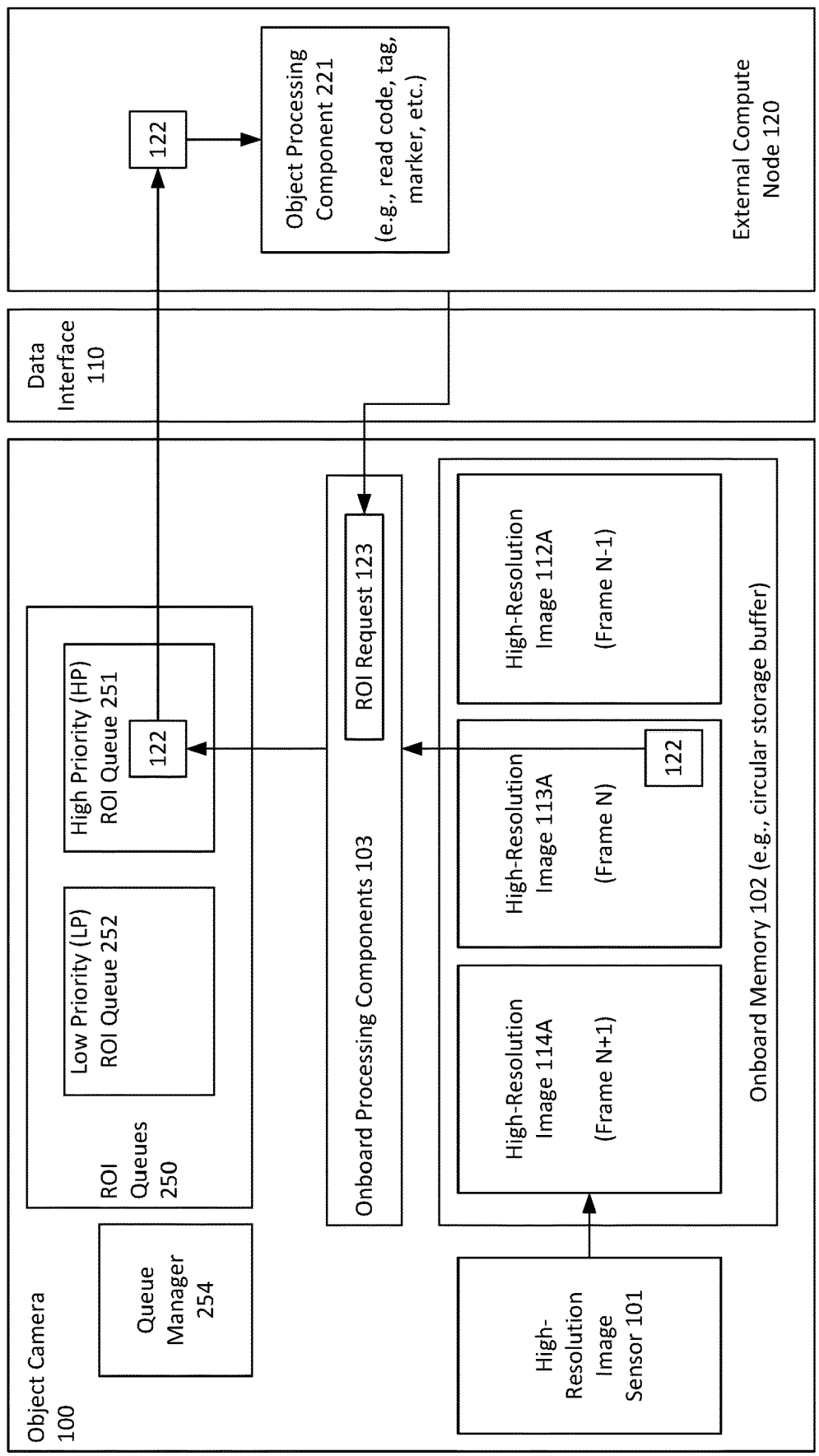
FIG. 2 is a diagram illustrating example object camera and external compute node interactions related to a transmission of a region of interest that may be used in accordance with the present disclosure.

As shown in FIG. 1, the object camera 100 includes a high-resolution image sensor 101 that captures high-resolution images 111A-113A. The high-resolution image sensor 101 may be any of a variety of image sensors, such as those employed in various standard cameras. In some examples, a plurality of image sensors may be used in the object camera 100. Specifically, high-resolution image 113A corresponds to frame N, which is the most recently captured frame shown in FIG. 1. Additionally, high-resolution image 112A corresponds to frame N−1, which is the second-most recently captured frame shown in FIG. 1. High-resolution image 111A corresponds to frame N−2, which is the oldest (least-recently captured) frame shown in FIG. 1. Additionally, the object camera 100 includes onboard memory 102, such as a circular storage buffer, for storing the high-resolution images 111A-113A. In some examples, a circular storage buffer may operate by storing a given quantity of the most recently captured high-resolution images that are captured by the high-resolution image sensor 101. When the circular storage buffer becomes full, the circular storage buffer may create additional storage capacity for storing a most recently captured image by deleting the oldest image that is currently stored in the storage buffer. In the example of FIG. 2, high-resolution image 111A (corresponding to Frame N−2) is deleted from the onboard memory 102 to create additional capacity for storing high-resolution image 114A (corresponding to Frame N+1).

Referring back to FIG. 1, the object camera 100 includes onboard processing components 103, which perform image down-sampling for high-resolution images 111A-113A. In the example of FIG. 1, high-resolution image 113A is down-sampled to generate low-resolution image 113B, which also corresponds to Frame N. Thus, high-resolution image 113A and low-resolution 113B both correspond to the same frame (Frame N), meaning that they are images of the same frame at different resolutions. High-resolution images 111A and 112A may also be down-sampled to generate low-resolution images of Frames N−2 and N−1, respectively (not shown in FIG. 1). The terms high-resolution and low-resolution, as used herein, are not limited to any specific resolution values. Rather, the terms are employed herein to indicate that a high-resolution image of a frame has a higher resolution than the corresponding low-resolution image of the same frame. For example, high-resolution image 113A will have a higher resolution than low-resolution image 113B, which both correspond to the same frame (Frame N). Similarly, a low-resolution image has a lower resolution than the corresponding high-resolution image of the same frame. For example, low-resolution image 113B will have a lower resolution than high-resolution image 113A, which both correspond to the same frame (Frame N). It is not required, however, that high-resolution image 113A and low-resolution image 113B must have any specific resolution values.

In some examples, the down-sampled low-resolution images generated by the object camera 100 may be transmitted to the external compute node 120. For example, as shown in FIG. 1, low-resolution image 113B is transmitted, from the object camera 100, to the external compute node 120 via data interface 110. Although not shown in FIG. 1, respective low-resolution images Frames N−1 and N−2 may also be generated and transmitted to the external compute node 120. Upon receipt of low-resolution image 113B, the object detection component 121 of external compute node 120 may perform an object detection analysis on the low-resolution image 113B to detect an object of interest, such as a machine-readable data object (e.g., barcode, fiducial tag, etc.), a person's face, a license plate, and many others. In some examples, the detected object (or objects) of interest may be detected using one or more deep learning (DL) object detection algorithms. The object detection component 121 may then determine a region of interest (ROI) 122, which is a portion of the corresponding frame that includes at least part of one or more objects of interest. In some examples, the object detection task may include detecting an object in the spatial coordinates as well as detecting the object or event along the temporal direction. In other words, not every frame may include an object of interest, as a location and/or orientation of an object may change over time, with the object potentially moving in and/or moving out of a camera's field of view.

Upon determining the region of interest 122, the external compute node 120 may issue a region of interest request 123 to the object camera 100. The region of interest request 123 is a request for a high-resolution version of the region of interest 122. In some examples, the region of interest request 123 may identify a plurality of regions of interest, potentially from more than one frame. For the region of interest 122, the region of interest request 123 may include location information, such as two-dimensional coordinate values, that identifies the location of the region of interest 122 within the frame. Additionally, the region of interest request 123 may also include a frame number that identifies the frame in which the region of interest 122 is included (Frame N). The region of interest request 123 may also indicate a respective identification number for the region of interest 122. The region of interest request 123 may also indicate a transmission priority (e.g., high priority or low priority) for the region of interest 122. The ROI transmission priorities are discussed in greater detail in following portions of this description. Similar information may also be included for each other region of interest (if any) that may be identified in region of interest request 123.

Referring now to FIG. 2, it is shown that the region of interest request 123 may be received, by the onboard processing components 103 of object camera 100, from the external compute node 120. Upon receipt of the region of interest request 123, onboard processing components 103 may obtain the region of interest 122 from high-resolution image 113A. Specifically, the onboard processing components 103 may determine that the region of interest 122 is to be obtained from high-resolution image 113A based on the frame number (Frame N) for the region of interest 122, which may be included in the region of interest request 123 as described above. The onboard processing components 103 may then extract the region of interest 122 from the high-resolution image 113A based on location information (e.g., two-dimensional image coordinates) for the region of interest 122, which may also be included in the region of interest request 123. The region of interest 122 may then be queued in one of ROI queues 250. In the example of FIG. 2, ROI queues 250 include high priority (HP) ROI queue 251 and low priority (LP) ROI queue 252. For example, if the region of interest request 123 indicates that the region of interest 122 has a high transmission priority, then the region of interest 122 may be queued in the HP ROI queue 251. By contrast, if the region of interest request 123 indicates that the region of interest 122 has a low transmission priority, then the region of interest 122 may be queued in the LP ROI queue 252. In the example of FIG. 2, the region of interest 122 has a high transmission priority and is, therefore, queued in HP ROI queue 251. The HP ROI queue 251 and LP ROI queue 252 are discussed in greater detail in following portions of this description. When the requested high-resolution version of the region of interest 122 is ready to be transmitted (e.g., based at least in part on reaching the front of the HP ROI queue 251 as described below), it may be transmitted to the external compute node 120.

Upon receipt of the high-resolution version of the region of interest 122, the object processing component 221 of the external compute node 120 may perform additional processing operations on the high-resolution version of the region of interest 122, such as reading of a machine-readable data object, recognizing a person's face and identity, reading and identifying a license plate number, and many others. For example, a detected tag may be read to identify and/or classify one or more products or other items in the image, to identify a location of a camera (e.g., for autonomous vehicle-based or other moving cameras), and for many other reasons. As another example, for facial recognition applications, a person's face may be recognized to determine an identity of an individual that is shown an in image. As yet another example, for traffic applications, a license plate may be read to identify a vehicle that is shown in an image.

In one specific example, the object camera-based techniques described herein may be employed to perform barcode reading for automated and/or human-operated workcells. In some cases, to cover a large field of view at different orientations, multiple cameras may be pointing at different locations and/or orientations to detect the barcodes in video streams. For example, one camera may cover a top-down view, while other cameras may cover the bottom-up and side views. In some examples, at any time point within a pick and place event in an automated workcell, only a small number of frames across multiple cameras may have a barcode within the field of view. Additionally, in some examples, if the barcode exists within the frame, the barcode may occupy only a small portion of the frame, such as less than one percent of an entire high-resolution image. In some cases, within both the spatial and the temporal axis, the barcode may include less than 0.1 percent of the total data.

Figure 3:
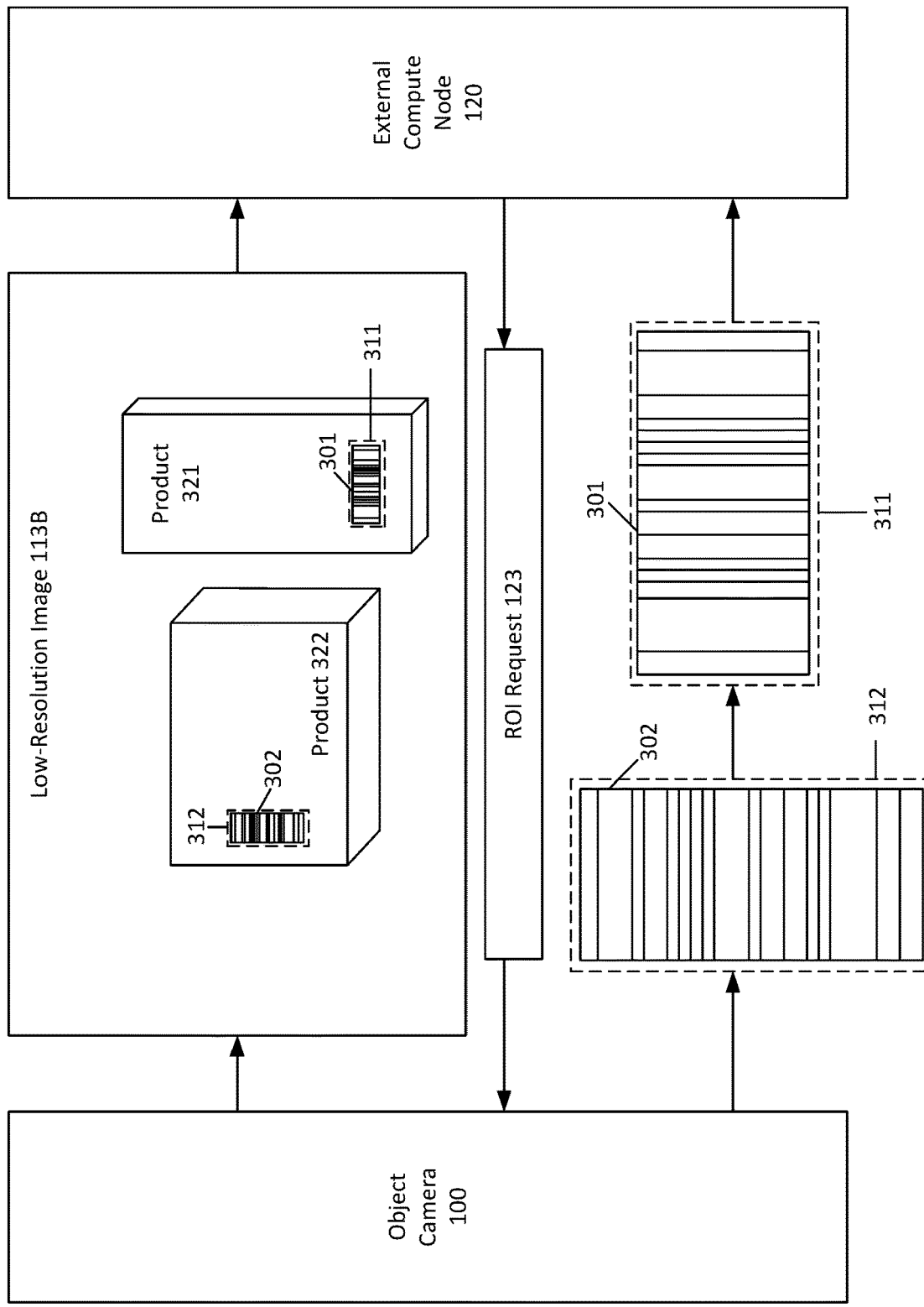
FIG. 3 is a diagram illustrating example barcode-based object camera and external compute node interactions that may be used in accordance with the present disclosure.

Referring now to FIG. 3, an example is shown in which object camera 100 captures images that are used to detect products based on their barcodes. Specifically, as shown in FIG. 3, low-resolution image 113B is transmitted from object camera 100 to external compute node 120 (as also shown in FIG. 1 and described above). In the example of FIG. 3, the low-resolution image 113B displays products 321 and 322. Each of the products 321 and 322 may be identified using barcodes 301 and 302, respectively, which are printed on surfaces of products 321 and 322 and which are also shown in FIG. 3. The external compute node 120 may perform an object detection analysis on the low-resolution image 113B to detect the barcodes 301 and 302, which, in this example, are the objects of interest that are read to identify the products 321 and 322. Upon detecting barcode 301, the external compute node 120 may determine a region of interest 311 that includes the barcode 301. The region of interest 311 is shown in FIG. 3 using a respective dashed-line box and includes the area within the respective dashed-line box. Additionally, upon detecting barcode 302, the external compute node 120 may determine a region of interest 312 that includes the barcode 302. The region of interest 312 is shown in FIG. 3 using a respective dashed-line box and includes the area within the respective dashed-line box. The external compute node 120 may then issue the region of interest request 123 to the object camera 100. As described above, the region of interest request 123 may include a frame number (Frame N) associated with the low-resolution image 113B. In this example, the region of interest request 123 may also request the regions of interest 311 and 312, such as by providing location information (e.g., two-dimensional image coordinate values) that identifies the locations of the regions of interest 311 and 312 within the low-resolution image 113B.

Upon receipt of the region of interest request 123, the object camera 100 may identify the high-resolution image that 113A as the high-resolution version of Frame N. The object camera 100 may then use the location information for the regions of interest 311 and 312 in order to locate and extract high-resolution versions of the regions of interest 311 and 312 from the high-resolution image 113A. As shown at the bottom of FIG. 3, the object camera 100 may then transmit the extracted high-resolution versions of the regions of interest 311 and 312 to the external compute node 120. It is noted that the high-resolution versions of the regions of interest 311 and 312, which are extracted from the high-resolution image 113A, are shown at the bottom of FIG. 3 with a larger size than the low-resolution versions of regions of interest 311 and 312, which are included in the low-resolution image 113B at the top of FIG. 3. This larger size indicates that the high-resolution versions of the regions of interest 311 and 312, which are extracted from the high-resolution image 113A, have a higher resolution than the low-resolution versions of regions of interest 311 and 312, which are included in the low-resolution image 113B. The external compute node may then use the high-resolution versions of the regions of interest 311 and 312 to read the barcodes 301 and 302, respectively, and identify the products 321 and 322, respectively.

In some other examples, fiducial tags, such as April tags and others, may be detected in images captured by the object camera 100. For example, in some cases, autonomous vehicles may include cameras that may capture images of fiducial tags, and the fiducial tags may identify respective locations that are used to determine a current location of the autonomous vehicle. Fiducial tags may be employed in indoor and/or outdoor locations. In some cases, however, these techniques may be particularly advantageous in indoor locations, such as warehouses, in which other location techniques, such as global positioning system (GPS)-based location techniques, may be difficult to implement, for example due to reduced signal strength within the indoor structure. Additionally, the use of fiducial tags may often provide a more precise and accurate location than GPS-based location techniques. In some cases, autonomous vehicles may be used in a highly structured manner in which they travel from location-to-location, for example within a warehouse, such as based at least in part on fiducial tags that may be displayed at each location. In some other cases, autonomous vehicles may be used in a less structured manner, in which they may travel more freely throughout a location, such as a warehouse, and in which fiducial tags may be used to periodically assist in reorienting of the autonomous vehicles.

In yet other examples, fiducial tags may be used to determine locations and/or orientations of objects within an image. In one specific example, a robotic arm may have fiducial tags that surround the robotic arm, such as to identify different sides of the robotic arm as the robotic arm spins around. This may, for example, assist in determining a shape and/or structure of a product that may be held by the robotic arm and that may also be included in captured images. In both the autonomous vehicle and robotic arm implementations, the fiducial tag may often include less than one percent of the data within the combined temporal and spatial dimensions.

Figure 4:
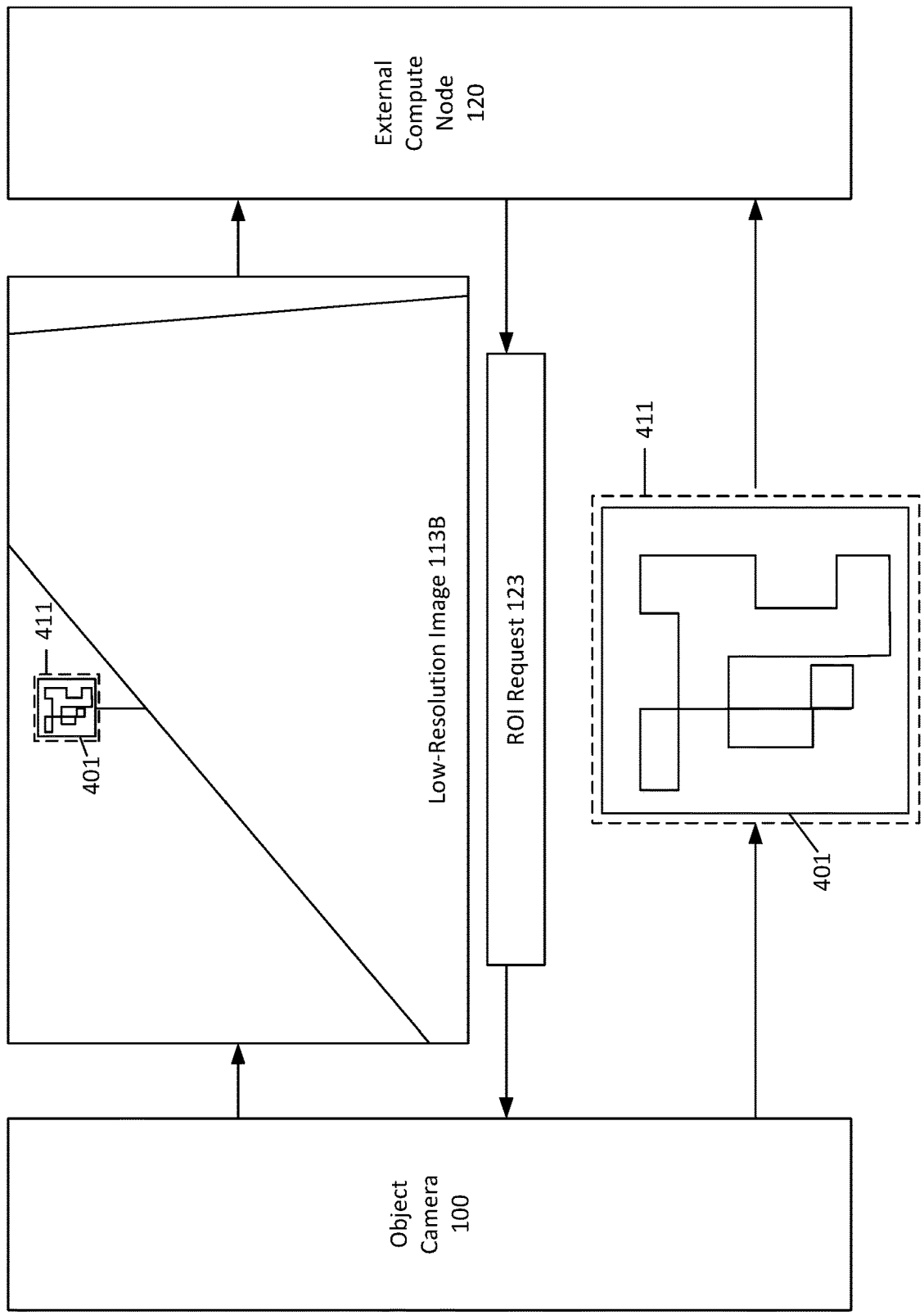
FIG. 4 is a diagram illustrating example fiducial tag-based object camera and external compute node interactions that may be used in accordance with the present disclosure.

Referring now to FIG. 4, an example is shown in which low-resolution image 113B includes a fiducial tag 401, such as may be displayed at a location in a warehouse or another indoor or outdoor location. The external compute node 120 may perform an object detection analysis on the low-resolution image 113B to detect the fiducial tag 401, which, in this example, is an object of interest. Upon detecting fiducial tag 401, the external compute node 120 may determine a region of interest 311 that includes the fiducial tag 401. The of region of interest 411 is shown in FIG. 4 using a respective dashed-line box and includes the area within the respective dashed-line box. The external compute node 120 may then issue the region of interest request 123 to the object camera 100. As described above, the region of interest request 123 may include a frame number (Frame N) associated with the low-resolution image 113B. In this example, the region of interest request 123 may also request the region of interest 411, such as by providing location information (e.g., two-dimensional image coordinate values) that identifies the locations of the region of interest 411 within the low-resolution image 113B.

Upon receipt of the region of interest request 123, the object camera 100 may identify the high-resolution image that 113A as the high-resolution version of Frame N. The object camera 100 may then use the location information for the region of interest 411 in order to locate and extract a high-resolution version of the region of interest 411 from the high-resolution image 113A. As shown at the bottom of FIG. 4, the object camera 100 may then transmit the extracted high-resolution version of the region of interest 411 to the external compute node 120. It is noted that the high-resolution version of the region of interest 411, which is extracted from the high-resolution image 113A, is shown at the bottom of FIG. 4 with a larger size than the low-resolution version of the region of interest 411, which is included in the low-resolution image 113B at the top of FIG. 4. This larger size indicates that the high-resolution version of the region of interest 411, which is extracted from the high-resolution image 113A, has a higher resolution than the low-resolution version of region of interest 411, which is included in the low-resolution image 113B.

In some examples, the object camera 100 may be a variable resolution and variable frame rate camera based on demand. The object camera 100 may acquire and store images at higher resolution and higher frame rate internally, and it transmits a lower resolution and lower frame rate image stream to the external compute node 120. Once an object of interest is detected by the external compute node 120, high-resolution regions of interest at high frame rates may be requested from the object camera 100. The object camera 100 may significantly reduce the network interface bottleneck, and it may enable data acquisition beyond the capacity of the network interface (e.g., data interface 110). Thus, the object camera 100 may have a captured frame rate and external frame rate that are decoupled from one another. The captured frame rate may correspond to the frame rate at which the object camera 100 captures high-resolution images, while the external frame rate may correspond to the frame rate at which the object camera down-samples all, or only some, of the captured images to low-resolution images and transmits the low-resolution images. External frames are frames for which captured high-resolution images are down-sampled to corresponding low-resolution images that are sent to the external compute node 120. By contrast, internal frames are frames for which captured high-resolution images are not down-sampled to corresponding low-resolution images and are not transmitted to the external compute node 120 as low-resolution images. The captured frame rate is the frame rate at which the camera captures all frames, including both external and internal frames (though all frames may be external frames in scenarios when the captured and external frame rates are identical). The captured and external frame rate decoupling may enable the captured frame rate to be set to equal to or greater than the external frame rate. This may further reduce the data rate from the object camera 100 to the external compute node 120. This may also enable high resolution image acquisition frame rates beyond the limits of data transfer interface capacity. If an event is detected, then ROI's from intermediate frames may be requested. An intermediate frame is a frame for which a down-sampled low-resolution image is not transmitted from the object camera 100 to the external compute node 120. Rare events can be acquired at high frame rates without burdening the interface. For example, if a scene is mostly static but occasionally becomes dynamic for short periods of time, the camera external frame rate could be set to a low frames-per-second (fps) to capture the static scene, while high frame rate internal frames capture the dynamic scene and have regions of interest that are requestable by the external compute node 120.

Also, in some examples, the object camera 100 may have a priority setting for ROI transmission, and this priority setting may be indicated in ROI requests. Referring back to FIG. 2, it is shown that the object camera 100 may have ROI queues 250, which may include high priority (HP) ROI queue 251 and a low priority (LP) ROI queue 252. If a given ROI has a high priority, then information for the ROI may be copied to HP ROI queue 251. By contrast, if a given ROI interest has a low priority, then information for the ROI may be copied to LP ROI queue 252. In this example, a queue manager 254 manages the ROI queues 250. The external compute node 120 may determine the priority of an ROI, for example based on factors such as confidence in detection, location and size of the ROI, frame number, and others. The object camera 100 may transmit the high priority ROI's first, and transmit low priority ROI's only if there is room in the network bandwidth. Thus, in some examples, the ROI prioritization and ROI data load balance may be determined by the external compute node 120. Also, in some examples, if the object camera 100 is overloaded, it may manage the frame drops and ROI drops independent of the underlying application.

In some examples, the object camera 100 may have a setting that allows a selection between transferring down-sampled low-resolution (LR) images first or transferring high priority (HP) ROI's first. In some examples, transferring down-sampled low-resolution images first may be the default option for this setting. Using this option, a fixed LR frame rate can be guaranteed. By contrast, this setting can be set to the option to transfer HP ROI's first, which may clear the HP ROI queue 251 before a next LR image is transferred. The option to transfer HP ROI's first may be preferable in some speed critical applications. Regardless of whether LR images or HP ROI's are transferred first, LP ROI's may always be transferred last.

When the captured frame rate is set to greater than the external frame rate, the object camera 100 may handle ROI requests that are received before the corresponding high-resolution images are acquired. The queue manager 254 may manage these ROI's and transfer them when the corresponding high-resolution images become available. In some examples, the object camera 100 may support both first-in-first-out (FIFO) and last-in-first-out (LIFO) ROI transfer schedules. For example, in some cases, the external compute node 120 may continuously request an ordered stream of high priority and low priority ROI's. For each of the HP ROI queue 251 and the LP ROI queue 252, the object camera 100 may support an option to transfer the ROI's either in FIFO or LIFO order.

In some examples, ROI requests that may be corrupt due to overwriting to the circular buffer may be dropped and reported back to the external compute node 120. For example, in some cases, any ROI requests from the oldest frame may be dropped to prevent memory conflicts with the circular image buffer write. Also, requests from images that are no longer in the circular image buffer may be dropped and reported back to the external compute node 120 as dropped frames.

Also, in some examples, the object camera 100 may have an option to operate as a standard camera when there are no ROI requests. In some examples, the object camera 100 may buffer at least a specified quantity (X) frames in high resolution (e.g., at least ten frames) for the purpose of ROI requests. The object camera 100 may support various different down-sampling rates, and the object camera 100 may support various different down-sampling methods, such as average down-sampling and decimation (nearest neighbor). The object camera 100 may also support color camera sensor down-sampling, and the object camera 100 may support an option of transferring raw color data or three-channel data after demosaicking. In some cases, the object camera may support, for examples, 5×5 color demosacking in addition to standard 2×2 debayering. The object camera 100 may support, for example, a 5GigE interface. The object camera 100 may support common standard camera low-level processing such as analog gain, color balancing, gamma correction and external trigger-based acquisition.

Figure 5:
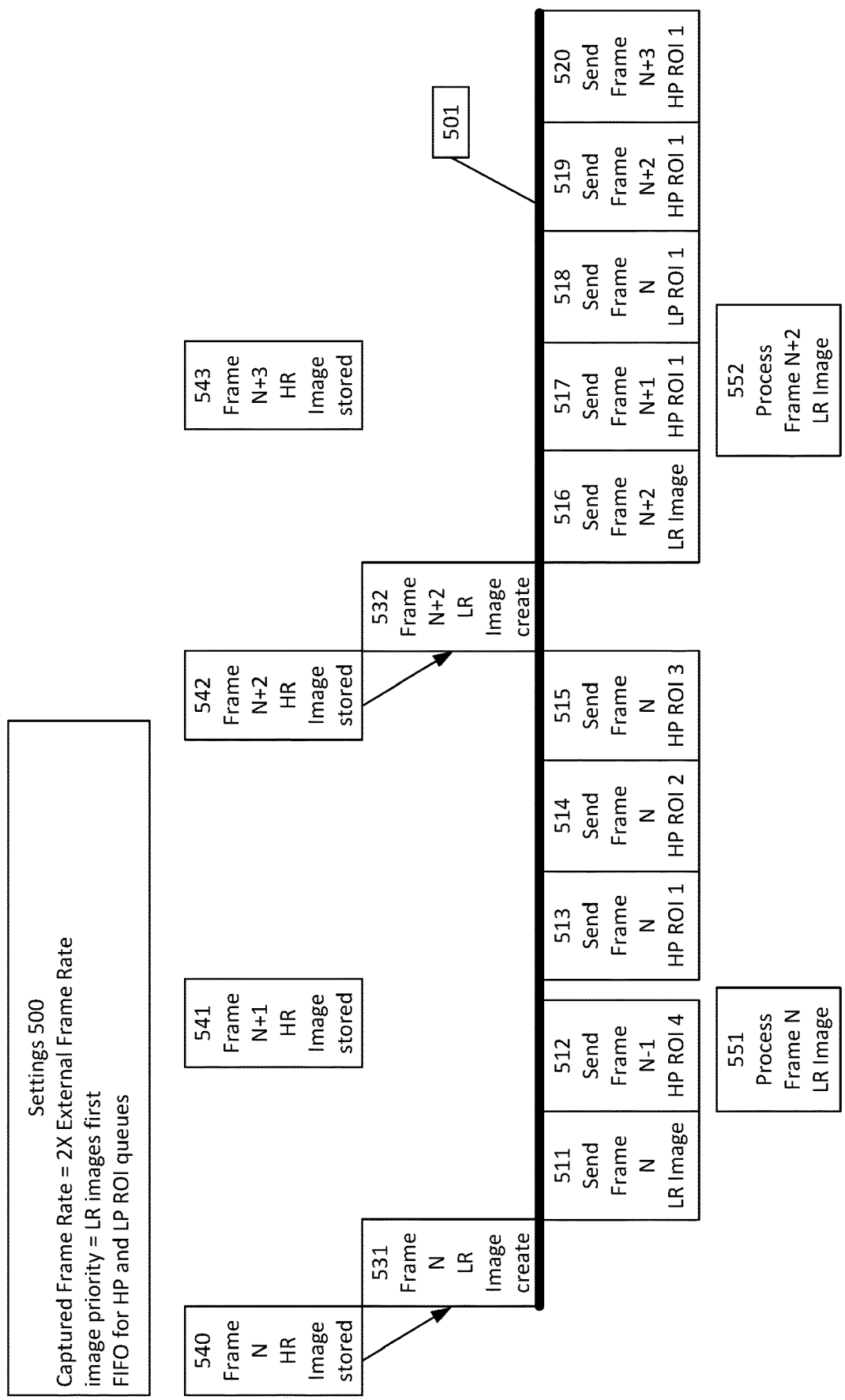
FIG. 5 is a diagram illustrating a first example object camera action sequence based on first example camera settings that may be used in accordance with the present disclosure.

Referring now to FIG. 5, some examples of settings 500 for object camera 100 will now be described in detail. As shown in settings 500, FIG. 5 illustrates an example in which the captured frame rate is twice (2×) the external frame rate. This means that, out of all the frames captured by the object camera 100, only half of those frames will be external frames (meaning that they are down-sampled to corresponding low-resolution images that are sent to the external compute node 120), while the other half will be internal frames (meaning that they are not down-sampled to corresponding low-resolution images and not transmitted to the external compute node 120 as low-resolution images). The captured frame rate is the frame rate at which the camera captures all frames, including both external and internal frames (though all frames may be external frames in scenarios when the captured and external frame rates are identical). Specifically, when the captured frame rate is twice (2×) the external frame rate, the object camera 100 may alternate between external frames and internal frames. In the example of FIG. 5, Frames N and N+2 are external frames, while Frames N−1, N+1, and N+3 are internal frames. In FIG. 5, a timeline 501 (which is the thick horizontal line in FIG. 5) is shown for which time increases from the left to the right of FIG. 5.

Additionally, settings 500 indicates that the image priority is set to give first priority to low-resolution (LR) images. These means that the low-resolution (LR) images of each external frame are transmitted to the external compute node 120 as soon as those LR become available for transmission by the object camera 100. Furthermore, settings 500 indicates that frames are transmitted from the high priority (HP) ROI queue 251 and the low priority (LP) ROI queue 252 using a first-in-first-out (FIFO) retrieval scheme. The FIFO scheme means that, whenever the object camera 100 is free to transmit an HP ROI from the HP ROI queue 251, the object camera 100 will transmit the oldest queued HP ROI. In this example, because LR images are given first priority, the object camera 100 is only free to transmit an HP ROI when there are no current available unsent LR images. Similarly, the FIFO scheme also means that, whenever the object camera 100 is free to transmit an LP ROI from the LP ROI queue 252, the object camera 100 will transmit the oldest queued LP ROI. In this example, the object camera 100 is only free to transmit an LP ROI when there are no current available unsent LR images and also no current queued HP ROI's.

In the example of FIG. 5, high-resolution images of both external and internal frames are stored (at times 540-543) in onboard memory 102. Additionally, for external frames, a low-resolution image of the frame is subsequently created by the object camera 100, such as by down-sampling the high-resolution images. For example, at time 540, the high-resolution (HR) image of Frame N is stored by the object camera 100 in onboard memory 102. Subsequently, at time 531, a low-resolution (LR) image of Frame N is created. At time 511, once the LR image of Frame N is created, it is sent to the external compute node 120. At time 551, the LR image of Frame N is processed by the external compute node 120, which includes forming and sending an ROI request 123 for the LR image of Frame N. At time 512, high priority (HP) ROI 4, which is a last remaining queued requested ROI from Frame N−1, is sent to the external compute node 120. It is noted that, even though Frame N−1 precedes Frame N, the HP ROI 4 from Frame N−1 is not sent until after the LR image of Frame N is sent. This is because settings 500 indicate that the LR images have first priority for transmission, and the LR images are therefore sent as they become available. At time 541, the HR image of Frame N+1 is stored by the object camera 100 in onboard memory 102. However, because Frame N+1 is an internal frame, an LR image for Frame N+1 is not generated.

After the transmission of HP ROI 4 from Frame N−1 (at time 512), both the high priority (HP) ROI buffer and the low priority (LP) ROI buffer may be temporarily emptied (as represented by the gap between time 512 and time 513) until the ROI request 123 for Frame N is received by the object camera 100 from the external compute node, which occurs at the end of time 551. In this example, the external compute node 120 requests four total ROI's from Frame N, including three high priority (HP) ROI's (Frame N HP ROI's 1-3) and one low priority (LP) ROI (Frame N LP ROI 1). At time 513, upon receipt of the ROI request 123 for Frame N, the object camera 100 transmits Frame N HP ROI 1 to the external compute node 120. At time 514, the object camera 100 transmits Frame N HP ROI 2 to the external compute node 120. At time 515, the object camera 100 transmits Frame N HP ROI 3 to the external compute node 120.

At time 542, the HR image of Frame N+2 is stored by the object camera 100 in onboard memory 102. Because Frame N+2 is an external frame, an LR image for Frame N+2 is then generated at time 532. At time 516, the LR image of Frame N+2 is sent to the external compute node 120. At time 552, the LR image of Frame N+2 is processed by the external compute node 120, which includes forming and sending an ROI request 123 for the LR image of Frame N+2.

Even though Frame N+1 is not sent to the external compute node 120, a ROI (Frame N+1 HP ROI 1) is nevertheless requested from Frame N+1. At time 517, Frame N+1 HP ROI 1 is sent to the external compute node 120. It is noted that, even though Frame N+1 precedes Frame N+2, the Frame N+1 HP ROI 1 is not sent until after the LR image of Frame N+2 is sent. Again, this is because settings 500 indicate that the LR images have first priority for transmission, and the LR images are therefore sent as they become available. After transmitting of Frame N+1 HP ROI 1 at time 517, the high priority ROI queue 251 is emptied. Then, at time 518, the object camera 100 transmits Frame N LP ROI 1 to the external compute node 120. It is noted that, even though Frame N precedes Frame N+1, the Frame N LP ROI 1 is not sent until after the Frame N+1 HP ROI 1 is sent. This is because low priority ROI's are not sent until the high priority ROI queue 251 is emptied.

At the end of time 552, the object camera may receive an ROI request 123 for Frame N+2. In this example, the external compute node 120 requests only one ROI from Frame N+2 (Frame N+2 HP ROI 1). At time 519, the object camera 100 transmits Frame N+2 HP ROI 1 to the external compute node 120. At time 543, the HR image of Frame N+3 is stored by the object camera in onboard memory 102. However, because Frame N+3 is an internal frame, an LR image for Frame N+3 is not generated. Even though Frame N+3 is not sent to the external compute node 120, an ROI (Frame N+3 HP ROI 1) is nevertheless requested from Frame N+3. At time 520, Frame N+3 HP ROI 1 is sent to the external compute node 120.

Figure 6:
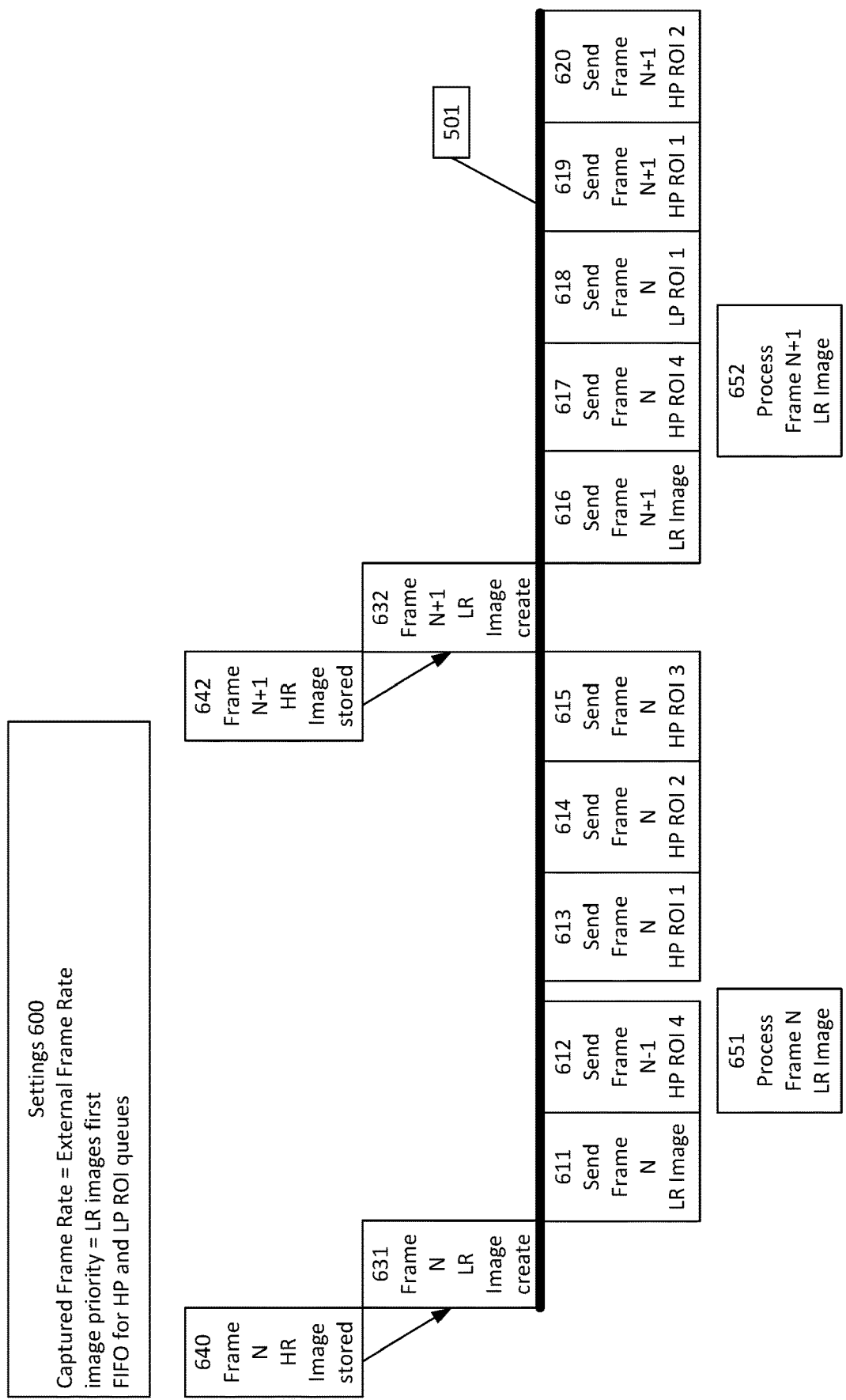
FIG. 6 is a diagram illustrating a second example object camera action sequence based on second example camera settings that may be used in accordance with the present disclosure.

Referring now to FIG. 6, some other examples of settings 600 for object camera 100 will now be described in detail. As shown in settings 600, FIG. 6 illustrates an example in which the captured frame rate is the same as the external frame rate. This means that all the frames captured by the object camera 100 will be external frames (meaning that they have corresponding low-resolution versions that are generated and sent to the external compute node 120), and there are no internal frames. In the example of FIG. 6, the external frame rate of the object camera 100 is the same as the external frame rate of the object camera 100 in the example of FIG. 5. However, in the example of FIG. 6, the captured frame rate of the object camera 100 is only half the captured frame rate of the object camera 100 in the example of FIG. 5. Thus, Frame N+1 in FIG. 6 is captured by object camera 100 at the same time as Frame N+2 in FIG. 5.

In the example of FIG. 6, at time 640, the high-resolution (HR) image of Frame N is stored by the object camera 100 in onboard memory 102. Subsequently, at time 631, a low-resolution (LR) image of Frame N is created. At time 611, once the LR image of Frame N is created, it is sent to the external compute node 120. At time 651, the LR image of Frame N is processed by the external compute node 120, which includes forming and sending an ROI request 123 for the LR image of Frame N. At time 612, high priority (HP) ROI 4, which is a last remaining queued requested ROI from Frame N−1, is sent to the external compute node 120. It is noted that, even though Frame N−1 precedes Frame N, the HP ROI 4 from Frame N−1 is not sent until after the LR image of Frame N is sent. This is because settings 600 indicate that the LR images have first priority for transmission, and the LR images are therefore sent as they become available.

After the transmission of HP ROI 4 from Frame N−1 (at time 612), both the high priority (HP) ROI buffer and the low priority (LP) ROI buffer may be temporarily emptied (as represented by the gap between time 612 and time 613) until the ROI request 123 for Frame N is received by the object camera 100 from the external compute node, which occurs at the end of time 651. In this example, the external compute node 120 requests five total ROI's from Frame N, including four high priority (HP) ROI's (Frame N HP ROI's 1-4) and one low priority (LP) ROI (Frame N LP ROI 1). At time 613, upon receipt of the ROI request 123 for Frame N, the object camera 100 transmits Frame N HP ROI 1 to the external compute node 120. At time 614, the object camera 100 transmits Frame N HP ROI 2 to the external compute node 120. At time 615, the object camera 100 transmits Frame N HP ROI 3 to the external compute node 120.

At time 642, the HR image of Frame N+1 is stored by the object camera 100 in onboard memory 102. Because Frame N+1 is an external frame, an LR image for Frame N+1 is then generated at time 632. At time 616, the LR image of Frame N+1 is sent to the external compute node 120. At time 652, the LR image of Frame N+1 is processed by the external compute node 120, which includes forming and sending an ROI request 123 for the LR image of Frame N+1.

At time 617, Frame N HP ROI 4 is sent to the external compute node 120. It is noted that, even though Frame N precedes Frame N+1, the Frame N HP ROI 4 is not sent until after the LR image of Frame N+1 is sent. Again, this is because settings 600 indicate that the LR images have first priority for transmission, and the LR images are therefore sent as they become available. After transmitting of Frame N HP ROI 4 at time 617, the high priority ROI queue 251 is emptied. Then, at time 618, the object camera 100 transmits Frame N LP ROI 1 to the external compute node 120.

At the end of time 652, the object camera may receive an ROI request 123 for Frame N+1. In this example, the external compute node 120 requests two ROI's from Frame N+1 (Frame N+1 HP ROI 1 and Frame N+1 HP ROI 2). At time 619, the object camera 100 transmits Frame N+1 HP ROI 1 to the external compute node 120. At time 620, Frame N+1 HP ROI 2 is sent to the external compute node 120.

Figure 7:
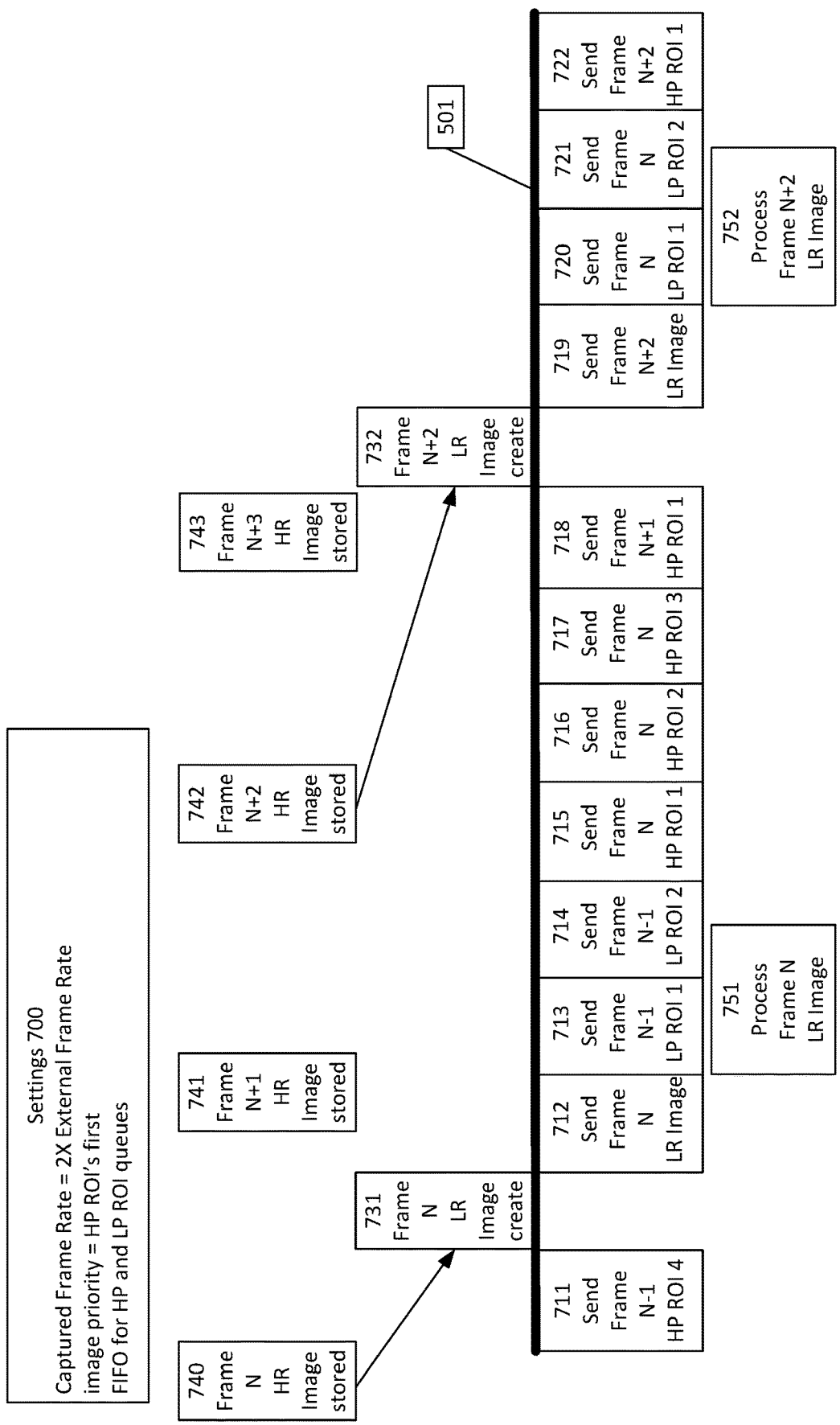
FIG. 7 is a diagram illustrating a third example object camera action sequence based on third example camera settings that may be used in accordance with the present disclosure.

Referring now to FIG. 7, some other examples of settings 700 for object camera 100 will now be described in detail. Similar to settings 500 of FIG. 5, settings 700 of FIG. 7 specify that the captured frame rate is twice (2×) the external frame rate. Also similar to settings 500 of FIG. 5, settings 700 of FIG. 7 indicate that frames are transmitted from the high priority (HP) ROI queue 251 and the low priority (LP) ROI queue 252 using a FIFO retrieval scheme. However, unlike settings 500 of FIG. 5, settings 700 of FIG. 7 specify that HP ROI's (as opposed to LR images) are given first priority. These means that LR images are only transmitted by the object camera when the HP ROI queue 251 has been emptied.

In the example of FIG. 7, at time 740, the high-resolution (HR) image of Frame N is stored by the object camera 100 in onboard memory 102. However, unlike in FIGS. 5 and 6, the low-resolution (LR) image of Frame N is not created immediately after the Frame N HR image is stored. This is because, at the end of time 740, there is still an HP ROI remaining in the HP ROI queue 251, which is Frame N−1 HP ROI 4. Accordingly, at time 711, Frame N−1 HP ROI 4, which is a last remaining queued HP ROI, is sent to the external compute node 120. Settings 700 indicate that the HP ROI's have first priority for transmission, which causes Frame N−1 HP ROI 4 to be sent prior to the Frame N LR image. After the HP ROI queue 251 is emptied, the Frame N LR image is created at time 731. At time 712, the Frame N LR image is sent to the external compute node 120. At time 751, the LR image of Frame N is processed by the external compute node 120, which includes forming and sending an ROI request 123 for the LR image of Frame N. At time 741, the HR image of Frame N+1 is stored by the object camera 100 in onboard memory 102. However, because Frame N+1 is an internal frame, an LR image for Frame N+1 is not generated.

In the example of FIG. 7, two low-priority ROI's (Frame N LP ROI 1 and Frame N LP ROI 2) are sent for Frame N−1. These LP ROI's may be requested based on prior frames and, therefore, are sent prior to receiving the ROI request 123 for Frame N. Frame N−1 LP ROI 1 is sent at time 713, and Frame N−1 LP ROI 2 is sent at time 714. At the end of time 751, the object camera 100 may receive an ROI request 123 for Frame N. In this example, the external compute node 120 requests three HP ROI's from Frame N (Frame N HP ROI 1, Frame N HP ROI 2 and Frame N HP ROI 3) and one extrapolated HP ROI from Frame N+1. Frame N HP ROI 1 is sent at time 715. Frame N HP ROI 2 is sent at time 716. Frame N HP ROI 3 is sent at time 717. At time 718, Frame N+1 HP ROI 1 is sent to the external compute node 120.

At time 742, the HR image of Frame N+2 is stored by the object camera 100 in onboard memory 102. However, unlike in FIGS. 5 and 6, the low-resolution (LR) image of Frame N+2 is not created immediately after the Frame N+2 HR image is stored. This is because, at the end of time 742, there are still HP ROI's remaining on the HP ROI queue 251. Settings 700 indicate that the HP ROI's have first priority for transmission, which causes Frame N HP ROI 2-3 and Frame N+1 HP ROI 1 to be sent prior to the Frame N+2 LR image. After the HP ROI queue 251 is emptied, the Frame N+2 LR image is created at time 732. At time 719, the Frame N+2 LR image is sent to the external compute node 120. At time 752, the LR image of Frame N+2 is processed by the external compute node 120, which includes forming and sending an ROI request 123 for the LR image of Frame N+2.

In the example of FIG. 7, two low-priority ROI's (Frame N LP ROI 1 and Frame N LP ROI 2) are sent for Frame N. These LP ROI's may be requested based on prior frames and, therefore, are sent prior to receiving the ROI request 123 for Frame N+2. Frame N LP ROI 1 is sent at time 720, and Frame N LP ROI 2 is sent at time 721. At the end of time 752, the object camera may receive an ROI request 123 for Frame N+2. In this example, the external compute node 120 requests only one ROI from Frame N+2 (Frame N+2 HP ROI 1). At time 722, the object camera 100 transmits Frame N+2 HP ROI 1 to the external compute node 120. At time 743, the HR image of Frame N+3 is stored by the object camera in onboard memory 102. However, because Frame N+3 is an internal frame, an LR image for Frame N+3 is not generated.

It is noted that settings 500, 600 and 700 are merely non-limiting examples, and it is noted that other settings may be employed. For example, whole FIGS. 5-7 relate to examples in which a FIFO retrieval scheme is used for the HP ROI's and the LP ROI's, the HP ROI's and the LP ROI's may alternatively be retrieved using a last-in-first-out (LIFO) retrieval scheme.

Some example specific applications for the object camera 100 will now be described in detail. Specifically, in a first example application, an array of object cameras may be employed to capture images of barcodes, such as barcodes 301 and 302 of FIG. 3. The array of object cameras may send low-resolution images to external compute node 120. In some specific examples, for this specific application, it may be advantageous to set the external frame rate of the object camera to be the same as the captured frame rate, to select the option to transfer LR images before HP ROI's, and to use a FIFO ROI retrieval schedule. In some cases, at any given time, a barcode may be visible only in the field of view (FOV) of one or more, but not all, of the cameras of the array. The external compute node 120 may detect the barcodes from the LR images and request ROI's for candidate detections. In this application, selection of the option to transmit LR images first (before HP ROI's) guaranties a fixed external frame rate.

In some examples, the object cameras may be application agnostic. It may therefore be the responsibility of external compute node 120 to balance the load between high priority and low priority requests. For example, depending on the graphics processing and other computer processing resources available to the external compute node 120, the number of requested ROI's and their priority (e.g., low vs. high priority) could be decided based on various factors, such as a quantity of detected ROI's from different views, sizes and positions of the ROI's, the confidence value of each candidate barcode ROI, and potentially other factors. For each candidate barcode location, the external compute node 120 may calculate a confidence value that is a metric correlated with how likely a detected ROI contains a barcode.

A variety of load balancing and ROI priority setting techniques based on criteria from multiple frames and multiple object cameras may be employed. Specifically, in a first example technique, the quantity of ROI's may be fixed. In this technique, the external compute node 120 requests a fixed number of HP ROI's and LP ROI's from each object camera. For example, ROI's with the (N) highest detection confidence scores may be requested with high priority, and the next (M) highest ROI's are requested with low priority. In one specific example, (N) may be set to three and (M) may be set to five, meaning that ROI's with the three highest detection confidence scores may be requested with high priority, and the next five highest ROI's are requested with low priority. As should be appreciated, this is merely a non-limiting example and different amounts may be employed for (N) and (M).

In a second example technique, the quantity of ROI's may be variable. In this technique, the external compute node 120 requests, from each camera, HP ROI's for all detected ROI's that have a confidence value greater than a high threshold. The external compute node 120 also requests, from each camera, LP ROI's for all detected ROI's that have a confidence value less than or equal to the high threshold and greater than a low threshold. In a third example technique, the quantity of ROI's is limited within a range. In this technique, all ROI's with the (N1) highest detection confidence scores may be requested with high priority from each camera. Additionally, the external compute node 120 also requests, from each camera, with high priority, up to (N2) remaining detected ROI's that have a confidence value greater than a high threshold. Furthermore, the next (M2) remaining ROI's with the highest detection confidence scores may be requested with low priority from each camera. Additionally, the external compute node 120 also requests, from each camera, with low priority, up to (M2) remaining detected ROI's that have a confidence value greater than a low threshold.

In a second example application, an object camera 100 may be used to capture images of barcodes on a fast-moving conveyor belt. In some examples, this type of application may involve transfer of data that would exceed the interface limit if the external frame rate was as high as the captured frame rate. Thus, in some examples, for this type of application, it may be advantageous to set the captured frame rate to be higher than the external frame rate, such as three times (3×) higher than the external frame rate. Additionally, in some examples, for this type of application, it may be advantageous to select the option to transfer LR images before HP ROI's, and to use a FIFO ROI retrieval schedule. By decoupling the captured frame rate from the external frame rate, the object camera 100 may overcome the interface bottleneck limit. For example, for fast moving objects like packages on a conveyor belt, a single camera may capture high resolution images at captured frame rates that are higher than external frame rates. While barcode decoding requires high resolution images, barcode detection can be performed at much lower resolutions.

In some example scenarios, the speed and the direction of a conveyer belt may be known. In these scenarios, whenever a barcode is detected, ROI's from intermediate frames may be requested to have additional observations and hence additional opportunities to decode the barcode. For example, a barcode in a far field of a given external frame may not have enough resolution to decode, but it could still be detected. By transferring ROI's from intermediate internal frames, the barcode may be observed in the near field and may be decoded. Also, the ROI's from frames that are further from the actual frame number in which the ROI is detected may optionally be requested with low priority.

Figure 8:
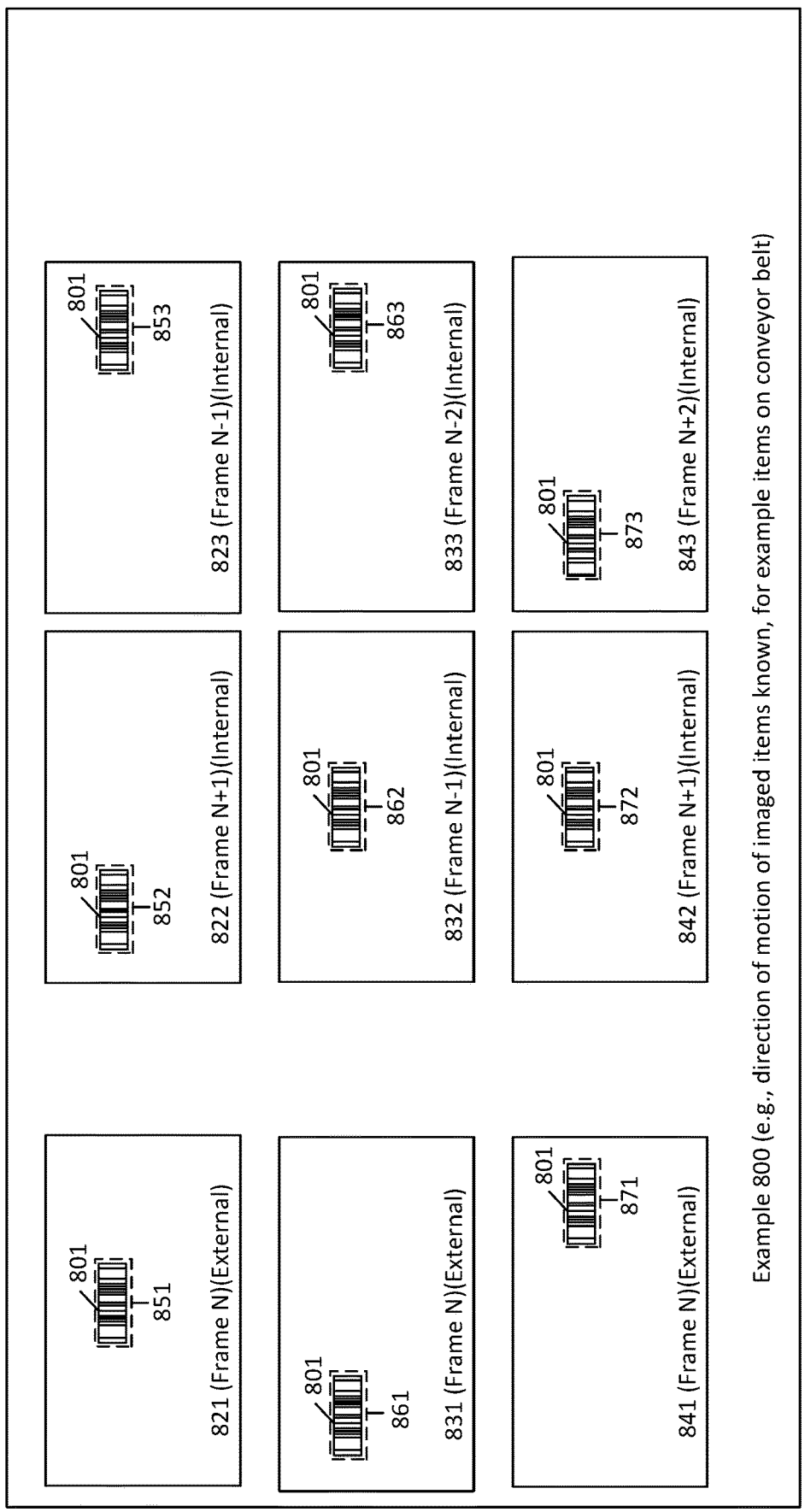
FIG. 8 is a diagram illustrating example regions of interest requested from an object camera for objects moving in a known direction that may be used in accordance with the present disclosure.

Referring now to FIG. 8, an example 800 is shown in which ROI's of intermediate frames may be requested and used to decode a barcode based on a known direction of movement. In example 800, a conveyer belt may be moving from right to left, which corresponds to the direction of arrow 803. In example 800, the captured frame rate is three times the external frame rate. Frame N is an external frame. Frames N−2, N−1, N+1 and N+2 are internal frames. Although not shown in FIG. 8, Frames N−3 and N+3 would be external frames. When a barcode 801 is detected in Frame N, which is an external frame, the location of the barcode 801 on the previous or upcoming internal frames may be calculated and requested from those internal frames. In example 800, the location of the barcode 801 on the previous or upcoming internal frames may be calculated because the rate and direction of the movement of the conveyor belt may be known. In example 800, the top row of images (including images 821, 822 and 823) shows a scenario in which the barcode 801 is detected in the center of Frame N (corresponding to image 821), and a corresponding ROI 851 is requested for Frame N. In this scenario, because the barcode 801 is detected in the center of Frame N, ROI's 853 and 852 may be calculated and requested from both the immediately preceding internal fame, which is Frame N−1 (corresponding to image 823), and the immediately subsequent internal fame, which is Frame N+1 (corresponding to image 822), respectively. Because the conveyor belt is moving from right to left, ROI 853 is towards the right side of Frame N−1, and ROI 852 is towards the left side of Frame N+1.

Additionally, in example 800, the middle row of images (including images 831, 832 and 833) shows a scenario in which the barcode 801 is detected towards the left side of Frame N (corresponding to image 831), and a corresponding ROI 861 is requested for Frame N. In this scenario, because the barcode 801 is detected towards the left side of Frame N, ROI's 862 and 863 may be calculated and requested from two preceding internal frames. Specifically, ROI 862 is requested from Frame N−1 (corresponding to image 832), and ROI 863 is requested from Frame N−2 (corresponding to image 833). Because the conveyor belt is moving from right to left, ROI 862 is in the center of Frame N−1, and ROI 863 is towards the right side of Frame N−2.

Furthermore, in example 800, the bottom row of images (including images 841, 842 and 843) shows a scenario in which the barcode 801 is detected towards the right side of Frame N (corresponding to image 841), and a corresponding ROI 871 is requested for Frame N. In this scenario, because the barcode 801 is detected towards the right side of Frame N, ROI's 872 and 873 may be calculated and requested from two subsequent internal frames. Specifically, ROI 872 is requested from Frame N+1 (corresponding to image 842), and ROI 873 is requested from Frame N+2 (corresponding to image 843). Because the conveyor belt is moving from right to left, ROI 872 is in the center of Frame N+1, and ROI 863 is towards the left side of Frame N+2. In the example of FIG. 8 it is assumed that the rate of movement of the conveyor belt is constant. However, in some other examples, although not shown in FIG. 8, the sizes of the predicted ROI's in internal frames may optionally be set larger than the sizes of detected ROI's in external frames, particularly along the direction of motion, to accommodate possible speed variation of the conveyor belt. In some examples, although the upcoming frames may or may not be immediately available on the object camera 100, the unavailable ROI's from future frames may not be dropped from the queue and may be transmitted upon becoming available.

In a third example application, an object camera 100 may be used to capture images of items in hands and barcodes for human workflows. In some specific examples, for this specific application, it may be advantageous to set the captured frame rate of the object camera 100 to be twice (2x) the external frame rate, to select the option to transfer LR images before HP ROI's, and to use a FIFO ROI retrieval schedule. In one specific example, a human may grab products that are marked with barcodes and insert the products into storage pods. The system may be setup with multiple cameras viewing a scene from different viewpoints. In addition to barcode detection, the LR images may also be submitted for other services, such as detecting a presence of an item in a hand, or an interaction of the hand with a pod where items are stored. Whenever a barcode is detected, additional ROI's from intermediate internal frames may also be requested, such as to have more opportunities to decode the items. Unlike the conveyer belt example (in which the direction of object motion is known), the direction of motion in human workflows may not be known in advance. Accordingly, because the direction of motion is not known in advance, larger ROI's may be requested from intermediate frames in human workflows. To prevent the ROI drops, extended ROI's from upcoming internal frames may be requested with low priority, because there may be additional external frames that may be used to calculate and request ROI's from these frames. ROI's from internal frames may enable more opportunities to decode barcodes that may have less glare, less obstruction or better viewing angles. In one specific example, the external frame rate could be set twenty fps, where the captured frame rate could be set to forty fps. Transferring twenty-megapixel (MP) images at forty fps from multiple cameras may be beyond the limits of some existing common camera interfaces. In some examples, with the object camera 100, only LR images that are an order of magnitude smaller may be transmitted at 20 fps, and high-resolution ROI's from external and internal images may be transmitted only if there is a detected object of interest.

Figure 9:
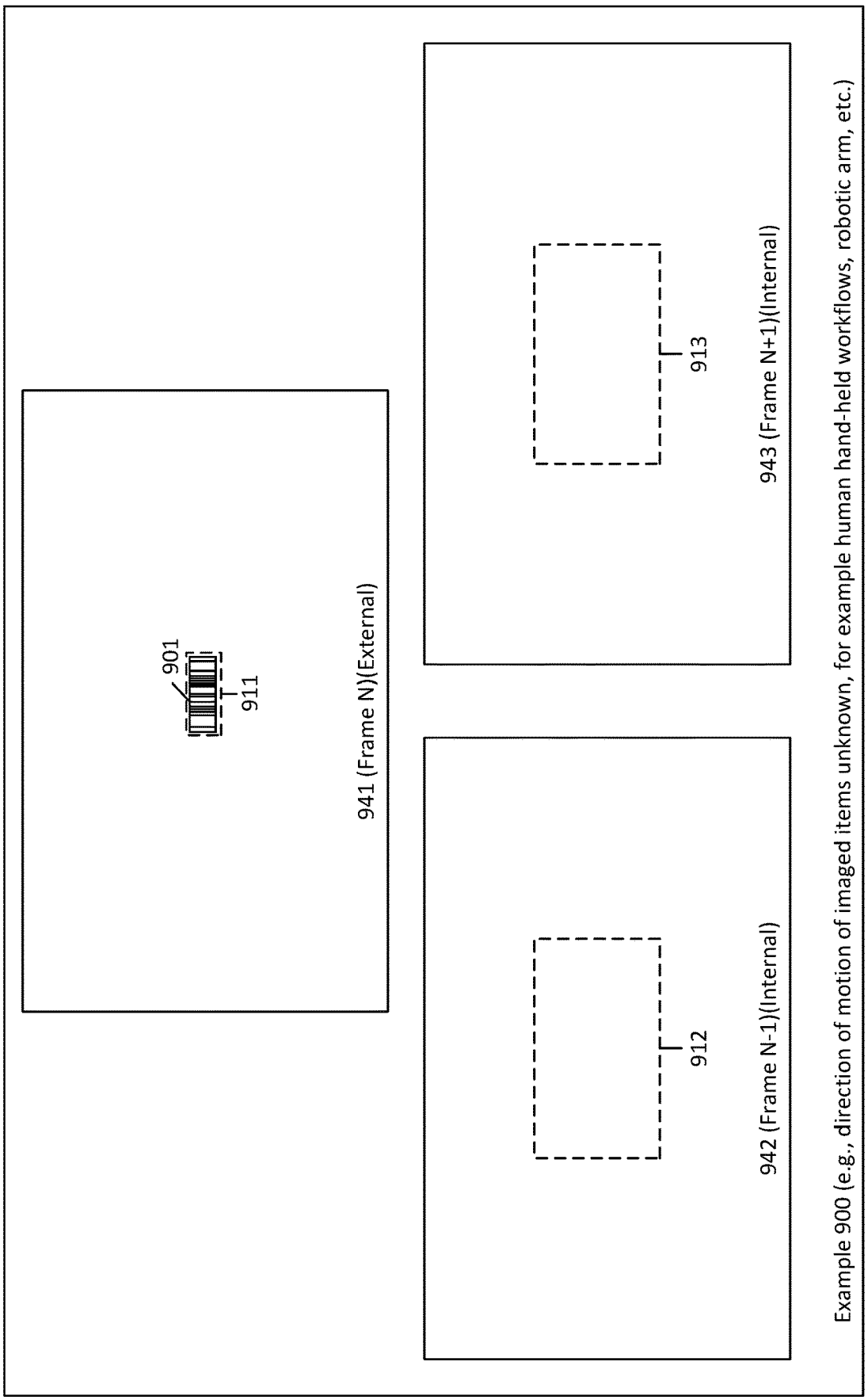
FIG. 9 is a diagram illustrating example regions of interest requested from an object camera for objects moving in an unknown direction that may be used in accordance with the present disclosure.

Referring now to FIG. 9, an example 900 is shown in which ROI's of intermediate frames may be requested and used to decode a barcode based on an unknown direction of movement. As described above, example 900 may relate to scenarios such as human workflows, for example in which a human hand is grabbing and moving objects in unknown directions. Example 900 may also relate to scenarios in which a robotic arm may be grabbing and moving objects in directions that aren't known in advance. In example 900, a barcode 901 is detected in external Frame N, which corresponds to image 941. A corresponding ROI 911 may be requested for Frame N. Additionally, ROI 912 may be requested for the immediately preceding internal frame, Frame N−1, which corresponds to image 942. Furthermore, ROI 913 may be requested for the immediately subsequent internal frame, Frame N+1, which corresponds to image 943. Because the direction of movement in example 900 is not known in advance, both ROI's 912 and 913 have a larger size than ROI 911, such as to be able to capture the barcode 901 when it is moved in a variety of potential directions of movement.

In a fourth example application, an object camera 100 may be used to capture images of items that are grabbed and moved by robotic arms. This fourth example application (robotic arm) may be similar to the third example application (human hand) except that, in the robotic workcells, the ROI from internal frames may be predicted with smaller error margins (as compared to human arm movement) leveraging known arm motion. The system may be setup with multiple cameras viewing a scene from different viewpoints. In some specific examples, for robotic arm movement, it may be advantageous to set the captured frame rate of the object camera 100 to be twice (2x) the external frame rate, to select the option to transfer LR images before HP ROI's, and to use a FIFO ROI retrieval schedule. Whenever objects of interest are detected in a LR image, in addition to ROI's from the current frame N, extended ROI's (with larger sizes than the ROI from the LR image) from the previous frame (Frame N−1), and the subsequent frame (Frame N+1) may also be requested, thereby achieving a higher frame rate only when needed.

In a fifth example application, an object camera 100 may be used to capture images of items in primarily static scenes that have only occasional dynamic action. In some specific examples, for occasional dynamic action, it may be advantageous to set the captured frame rate of the object camera 100 to be much faster than (e.g., 8x) the external frame rate, to select the option to transfer LR images before HP ROI's, and to use a FIFO ROI retrieval schedule. One example of this occasional dynamic action may occur when a robotic arm only occasionally picks items from a cluttered tote. A top-down camera may view the scene. During item pick, the scene becomes dynamic, and it may be advantageous to capture the details of the dynamic scene to recognize which item is picked from a cluttered tote. In some examples, a fiducial tag may be detected on the arm. Additionally, the end of the arm may be calculated as the pick location, and a high-resolution ROI from the pick location may be requested for all the intermediate internal frames. In one specific example, the captured frame rate is set to eight times (8x) the external frame rate. So, for every LR frame sent to external compute node, there are additional seven internal frames stored on the object camera 100. In this example, whenever presence of the robot arm is detected, additional ROI's from all seven previous internal frames may be requested, such as with high priority. Additionally, ROI's from all seven subsequent internal frames may be requested, such as with low priority. Therefore, the scene may be captured at high fps when dynamic action is detected, without the need to continuously stream at high data rates. In this application, the object camera 100 may behave as an on-demand high fps camera.

In a sixth example application, an object camera 100 may be used to capture images while moving, for example to capture images of April tags from a moving autonomous vehicle as described above. In some specific examples, for a camera moving at a relatively high rate of speed, it may be advantageous to set the captured frame rate of the object camera 100 to be much faster than (e.g., 10x) the external frame rate, to select the option to transfer LR images before HP ROI's, and to use a FIFO ROI retrieval schedule. As described above, autonomous drive units suffer from positional errors accumulated over time. To readjust the positions and correct for accumulated error, April tag fiducials with known locations may be placed in buildings, such as warehouses. When an April tag is detected, a location of the drive unit relative to the April tag may be used to adjust its position. However, requiring high resolution images at high frame rates may be demanding on the compute and bandwidth resources of the drive unit. Using an object camera, LR images may be sent to the external compute node 120 on the drive unit.

In some examples, for a captured frame rate that is ten times the external frame rate, when an April tag is detected for the first time on a current external frame (Frame N), ROI's from the current frame as well as previous 9 internal frames may be requested. The velocity and the direction of the drive unit may be used to determine where the ROI would be in the previous frames. In addition to previous frames, an ROI may also be requested from the upcoming frame (Frame N+1). Once the upcoming ROI is processed, the location of the ROI for the following frame (Frame N+2) may be calculated and requested, such as based on the actual location of the April tag in Frame N+1. This process may be repeated to request ROI's for each of the intermediate internal frames until an additional LR image is received to update location of the April tags. If the April tag is still in the field of view in the next LR image, then ROI's from the upcoming frames may continue to be requested using the above process. Once the April tag is outside the field of view in next LR image, then ROI's from upcoming frames may cease to be requested.

Figure 10:
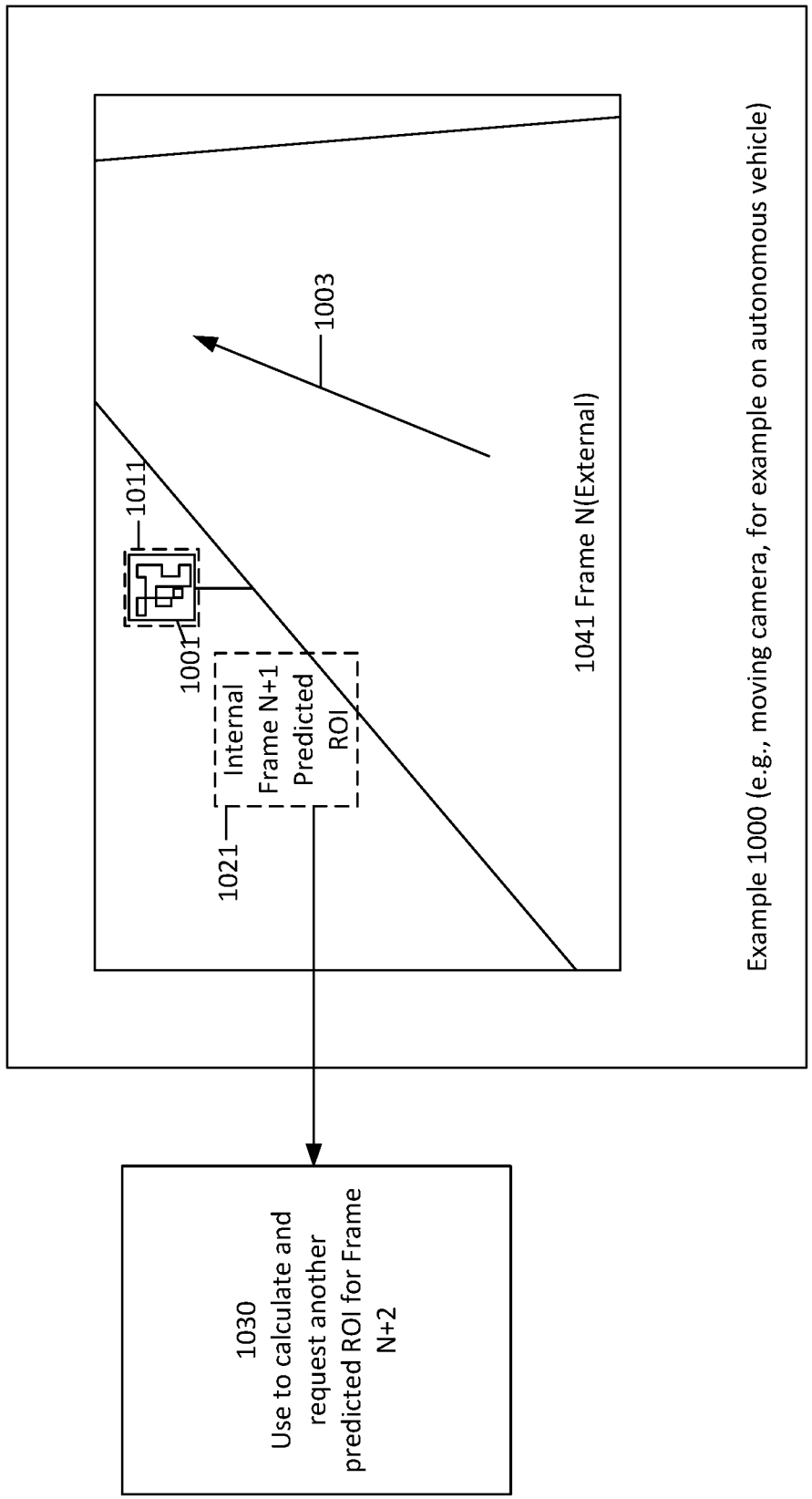
FIG. 10 is a diagram illustrating example regions of interest requested from a moving object camera that may be used in accordance with the present disclosure.

Referring now to FIG. 10, an example 1000 is now described for use of object camera 100 to capture images while moving, for example on an autonomous vehicle. As shown in FIG. 10, an April tag 1001 may be detected on Frame N corresponding to image 1041, which is an external image. Based on the location of the April tag 1001, the external compute node 120 may request ROI 1011 for Frame N. Additionally, based on the direction and rate of movement of the object camera 100, the external compute node 120 may also calculate Predicted ROI 1021, which is a predicted ROI for the subsequent internal frame (Frame N+1). The direction of movement of the object camera 100 is represented by arrow 1003. As shown, based on the predicted forward movement of the object camera 100, predicted ROI 1021 is larger than ROI 1011. Predicted ROI 1021 may also be enlarged in comparison to ROI 1011 to compensate for possible minor changes in speed and/or direction of the autonomous vehicle. As also shown at action 1030, the predicted ROI for Frame N+1 may be used to calculate and request another predicted ROI for the subsequent internal frame (Frame N+2).

In some examples, such as to further reduce the amount of data transmitted via data interface 110, the object camera 100 may perform a geometric transform associated with an ROI. In some cases, if the objects are defined with a geometric transform, the bandwidth requirements could be further reduced. Doing the geometric transformation on the object camera 100 may also reduce the amount of work performed by external compute node 120. In some examples, the external compute node 120 may request an object ROI with an additional geometric transformation function. The object camera 100 may then transform the object with the transformation function communicated by the external compute node 120. The object camera 100 may then send the transformed version of the object. The object camera 100 may also do interpolation during geometric transformation. For example, in low angle camera geometries, the geometric transform may be used to downsample the near field, while sampling the far field at the acquisition sampling. This may offload the transformation and interpolation from the external compute node 120, and it may reduce the amount of data transferred due to down-sampling during transformation. With this functionality, for example, barcodes that are rotated in the original HR image can be transformed to a horizontal coordinate system hence further reducing the bandwidth requirements.

Figure 11:
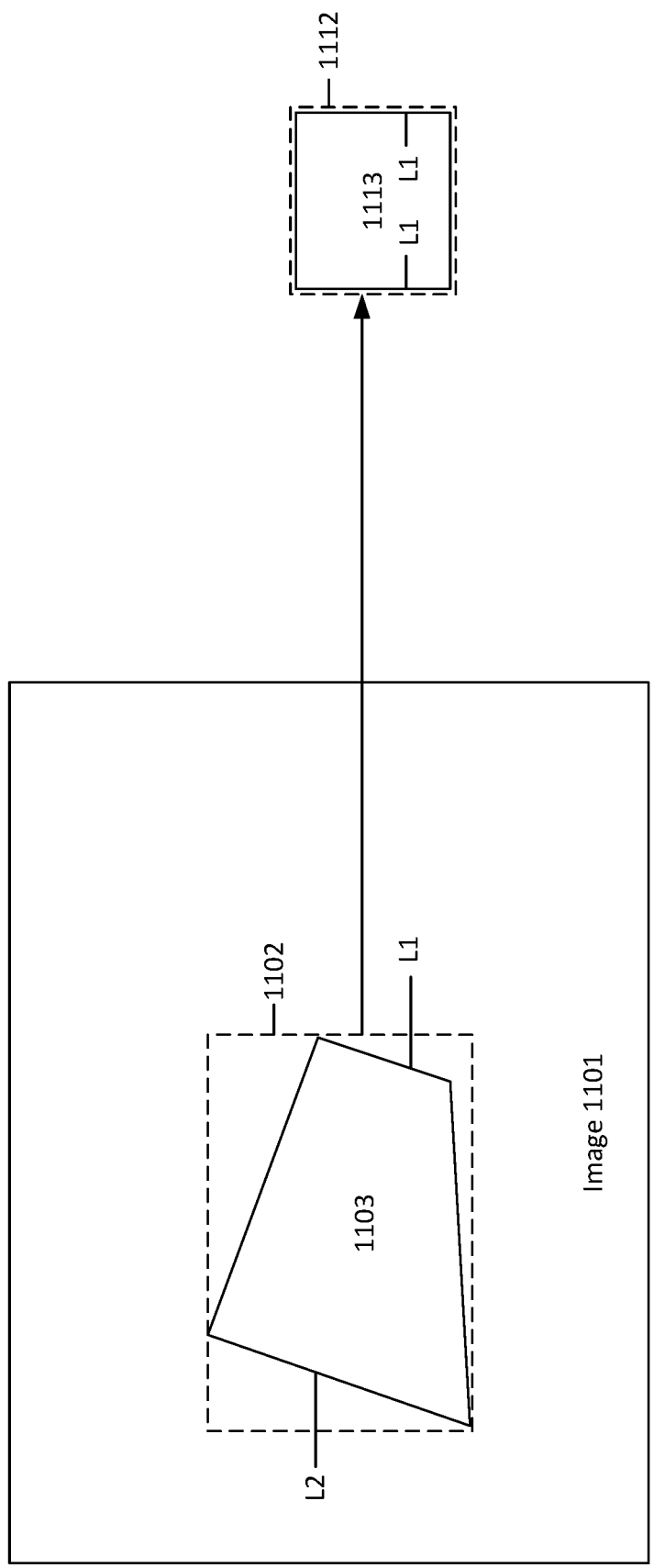
FIG. 11 is a diagram illustrating an example transformation performed by an object camera that may be used in accordance with the present disclosure.

Referring now to FIG. 11, an example transformation is shown. As shown, image 1101 is an image taken by object camera 100 at a narrow angle. The image 1101 includes an object 1103, which actually has a rectangular shape as a physical object, but which appears as a rotated trapezoid in image 1101. Original ROI 1102 is an ROI that would be transmitted, form the object camera 100, to the external compute node 120, if no transformation is performed. The far side of object 1003 has a length L1, while the near side of object 1003 has a length L2, which is longer than length L1. Instead of cropping the bounding box of the object 1103 (represented by original ROI 1102), the perspectivity may be corrected on the object camera 100 by applying a homography transformation to retain the length in the far field (length L1) while down-sampling the near field (length L2) to length L1. Hence a reduced object 1113 is formed having the same length (length L1) on both its left side and right side. A modified ROI 1112 may then be transmitted, by the object camera 100, to the external compute node 120, instead of transmitting the original ROI 1102. The homography is a transform that may correct for alignment as well as the perspective keystone effect. Thus, instead of transmitting a bounding box (original ROI 1102), a homography transformed ROI is transmitted (modified ROI 1112), which is corrected for rotation and perspectivity (homography) to implicitly down-sample the near field while sampling the far field at the acquired resolution.

FIG. 12 is a flowchart illustrating an example object camera image transmission process that may be used in accordance with the present disclosure. Any, or all, of the operations 1210-1222 of FIG. 12 may be performed by object camera 100. At operation 1210, a high-resolution image of a frame is captured, wherein the high-resolution image has a first resolution. For example, as shown in FIG. 1, high-resolution image 113A, corresponding to Frame N, is captured by high-resolution image sensor 101 of object camera 100. It is noted that images may be captured using any one or more of a variety of camera-based image capture techniques. At operation 1212, the high-resolution image is stored in an onboard memory of a camera device. For example, as shown in FIG. 1, high-resolution image 113A, corresponding to Frame N, is stored in onboard memory 102, for example a circular storage buffer. At operation 1214, the high-resolution image is down-sampled to a low-resolution image of the frame, wherein the low-resolution image has a second resolution that is lower than the first resolution. For example, as shown in FIG. 1, high-resolution image 113A, corresponding to Frame N, is down-sampled by onboard processing components 103 to low-resolution image 113B, corresponding to Frame N. As described above, the object camera 100 may support various different down-sampling rates, and the object camera 100 may support various different down-sampling methods, such as average down-sampling and decimation (nearest neighbor). The object camera 100 may also support color camera sensor down-sampling, and the object camera 100 may support an option of transferring raw color data or three-channel data after demosaicking. At operation 1216, the low-resolution image is transmitted to an external compute node that is external to the camera device. For example, as shown in FIG. 1, low-resolution image 113B is transmitted to external compute node 120, which is external to object camera 100, via data interface 110.

At operation 1218, a request for a region of interest from the high-resolution image is received from the external compute node. For example, as shown in FIG. 2, object camera 100 receives region of interest request 123, which is a request for region of interest 122 from high-resolution image 113A. The region of interest may be determined based on an object detection analysis that is performed on the low-resolution image. The region of interest may correspond to one or more objects that are at least partially displayed in the frame. The external compute node may detect the one or more objects based on the object detection analysis of the low-resolution image. In some examples, the detected object (or objects) of interest may be detected using one or more deep learning (DL) object detection algorithms. The one or more objects may comprise a machine-readable data object, such as a barcode or fiducial tag. In some examples, the region of interest request 123 may identify a plurality of regions of interest, potentially from more than one frame. For the region of interest 122, the region of interest request 123 may include location information, such as two-dimensional coordinate values, for the region of interest 122 within the frame. Additionally, the region of interest request 123 may also include a frame number that identifies the frame in which the region of interest 122 is included (Frame N). The region of interest request 123 may also indicate a respective identification number for the region of interest 122. The region of interest request 123 may also indicate one of a plurality of available transmission priorities (e.g., high priority or low priority) for the region of interest 122. Similar information may also be included for each other region of interest (if any) that may be identified in region of interest request 123.

At operation 1220, the region of interest is obtained from the high-resolution image. Obtaining the region of interest from the high-resolution image may, for example, include identifying and accessing the appropriate high-resolution image, identifying the region of interest within the high-resolution image, such as based on two-dimensional coordinate values or other location information, and extracting (e.g., copying) the region-of-interest from the high-resolution image to an ROI transmission buffer and/or ROI transmission queue. For example, upon receipt of the region of interest request 123, onboard processing components 103 may obtain the region of interest 122 from high-resolution image 113A. Specifically, the onboard processing components 103 may determine that the region of interest 122 is to be obtained from high-resolution image 113A based on the frame number (Frame N) for the region of interest 122, which may be included in the region of interest request 123 as described above. The onboard processing components 103 may then extract the region of interest 122 from the high-resolution image 113A based on location information (e.g., two-dimensional image coordinates) for the region of interest 122, which may also be included in the region of interest request 123. The region of interest 122 may then be queued in one of ROI queues 250. In the example of FIG. 2, ROI queues 250 include high priority (HP) ROI queue 251 and low priority (LP) ROI queue 252. For example, if the region of interest request 123 indicates that the region of interest 122 has a high transmission priority, then the region of interest 122 may be queued in the HP ROI queue 251. By contrast, if the region of interest request 123 indicates that the region of interest 122 has a low transmission priority, then the region of interest 122 may be queued in the LP ROI queue 252. In the example of FIG. 2, the region of interest 122 has a high transmission priority and is, therefore, queued in HP ROI queue 251.

At operation 1222, the region of interest from the high-resolution image is transmitted to the external compute node. For example, as shown in FIG. 2, region of interest 122 is transmitted, form object camera 100, to external compute node 120, via data interface 110. As described above, when the requested high-resolution version of the region of interest 122 is ready to be transmitted (e.g., based at least in part on reaching the front of the HP ROI queue 251 as described below), it may be transmitted to the external compute node 120. Upon receipt of the high-resolution version of the region of interest 122, the object processing component 221 of the external compute node 120 may perform additional processing operations on the high-resolution version of the region of interest 122, such as reading of a machine-readable data object, recognizing a person's face and identity, reading and identifying a license plate number, and many others. The external compute node 120 may read a machine-readable data object using the region of interest from the high-resolution image. For example, a detected tag may be read to identify and/or classify one or more products or other items in the image, to identify a location of a camera (e.g., for autonomous vehicle-based or other moving cameras), and for many other reasons. As another example, for facial recognition applications, a person's face may be recognized to determine an identity of an individual that is shown in an image. As yet another example, for traffic applications, a license plate may be read to identify a vehicle that is shown in an image. As described above, such as with reference to FIG. 11, prior to transmitting the region of interest, the object camera 100 may perform a geometric transformation on the region of interest including down-sampling a near-field of the region of interest.

Figure 13:
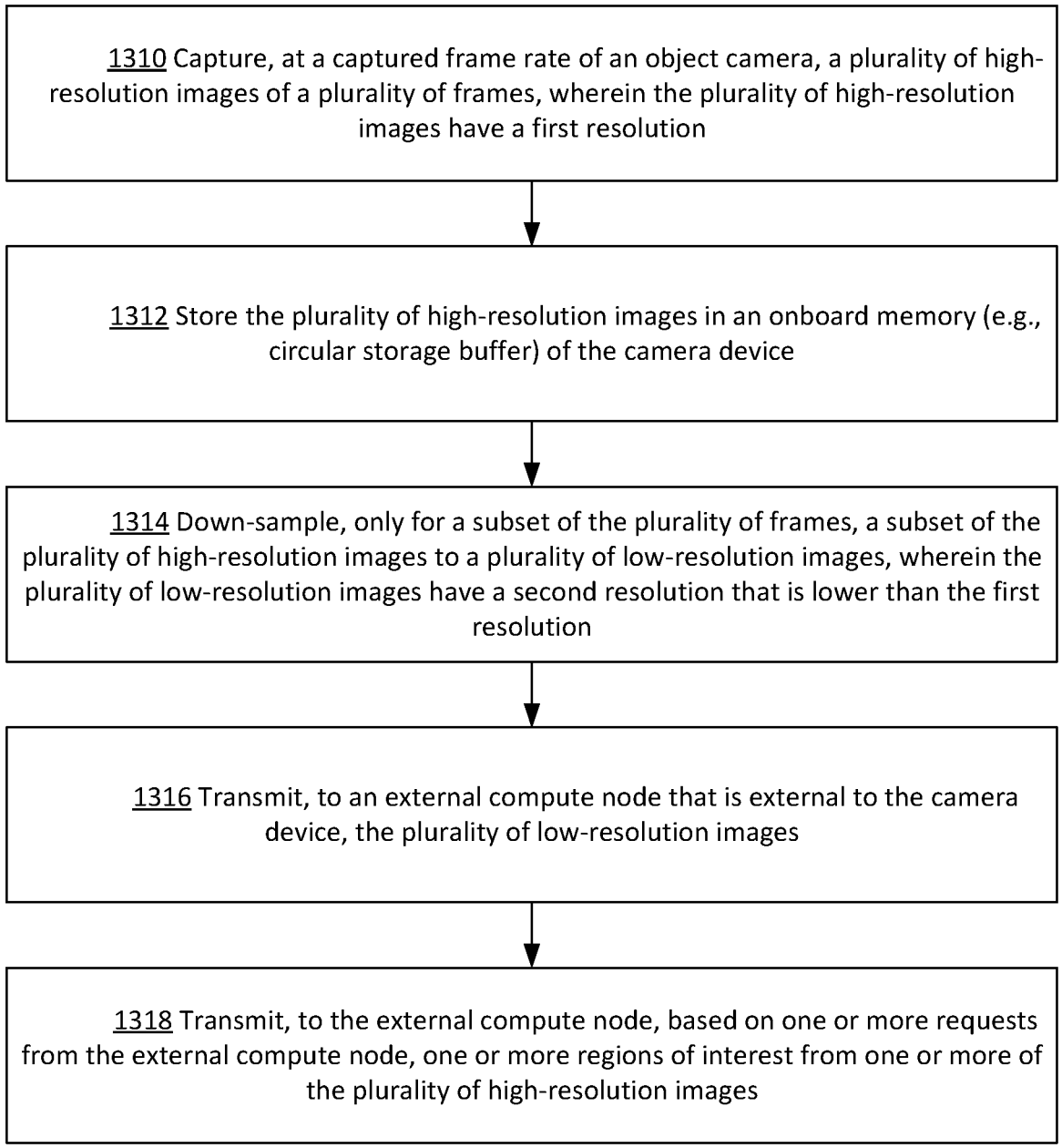
FIG. 13 is a flowchart illustrating an example decoupled frame rate multi-image transmission process that may be used in accordance with the present disclosure.

FIG. 13 is a flowchart illustrating an example decoupled frame rate multi-image transmission process that may be used in accordance with the present disclosure. Any, or all, of the operations 1310-1318 of FIG. 13 may be performed by object camera 100. At operation 1310, a plurality of high-resolution images of a plurality of frames are captured, at a captured frame rate of an object camera, wherein the plurality of high-resolution images have a first resolution. For example, as shown in FIG. 1, high-resolution images 111A, 112A and 113A, corresponding to Frame N−2, Frame N−1 and Frame N, respectively, are captured by high-resolution image sensor 101 of object camera 100. It is noted that images may be captured using any one or more of a variety of camera-based image capture techniques. As described above, a captured frame rate, as that term is used herein, refers to a rate at which a camera captures frames, including both external frames and internal frames. At operation 1312, the plurality of high-resolution images are stored in an onboard memory of a camera device. For example, as shown in FIG. 1, high-resolution images 111A, 112A and 113A, are stored in onboard memory 102, for example a circular storage buffer. There is no requirement that the plurality of high-resolution images must all be stored in the onboard memory together simultaneously.

At operation 1314, only for a subset of the plurality of frames, a subset of the plurality of high-resolution images are down-sampled to a plurality of low-resolution images, wherein the plurality of low-resolution images have a second resolution that is lower than the first resolution. As described above, down-sampling and transmission of low-resolution images may be performed based on a selectable external frame rate of the object camera. The selectable external frame rate may be decoupled from the captured frame rate. External frames are frames that are down-sampled and transmitted to the external compute node as low-resolution images. By contrast, internal frames are frames that are not down-sampled and not transmitted to the external compute node as low-resolution images. Thus, operation 1314 may be performed based on the selectable external frame rate of the camera device. For example, in some cases, if the captured frame rate is three times the external frame rate, the object camera may downsample and transmit low-resolution images for one out of every three captured high-resolution images, for example with each external frame followed by two intermediate internal frames. FIG. 8 shows an example 800 in which the captured frame rate is three times the external frame rate. In example 800, an external frame (Frame N) is preceded by two internal frames (Frame N−1 and Frame N−2) and is followed by two internal frames (Frame N+1 and Frame N+2). Although not shown in FIG. 8, Frames N−3 and N+3 would be external frames. As described above, the object camera 100 may support various different down-sampling rates, and the object camera 100 may support various different down-sampling methods, such as average down-sampling and decimation (nearest neighbor). The object camera 100 may also support color camera sensor down-sampling, and the object camera 100 may support an option of transferring raw color data or three-channel data after demosaicking. There is no requirement that the subset of the plurality of high-resolution images must all be down-sampled together simultaneously.

At operation 1316, the plurality of low-resolution images are transmitted to an external compute node that is external to the camera device. As described above, operation 1316 may be performed based on the selectable external frame rate of the camera device. For example, in some cases, if the captured frame rate is three times the external frame rate, the object camera may downsample and transmit low-resolution images for one out of every three captured high-resolution images, for example with each external frame followed by two intermediate internal frames. For example, an external frame (Frame N−3) may be down-sampled and transmitted to the external compute node as a low-resolution image. The two following frames (Frames N−2 and N−1) may be internal frames that are not down-sampled and not transmitted to the external compute node as low-resolution images. Another external frame (Frame N) may then be down-sampled and transmitted to the external compute node as a low-resolution image. The two following frames (Frames N+1 and N+2) may be internal frames that are not down-sampled and not transmitted to the external compute node as low-resolution images. Another external frame (Frame N+3) may then be down-sampled and transmitted to the external compute node as a low-resolution image.

At operation 1318, based on one or more requests (e.g., region of interest request 123) from the external compute node, one or more regions of interest from one or more of the plurality of high-resolution images are transmitted to the external compute node. The one or more requests from the external compute node may indicate one of a plurality of available transmission priorities for each of the one or more regions of interest. The plurality of available transmission priorities may comprise a high priority and a low priority. For example, as shown in FIG. 2, object camera 100 receives region of interest request 123, which is a request for region of interest 122 from high-resolution image 113A. In some examples, the region of interest request 123 may identify a plurality of regions of interest, potentially from more than one frame. For the region of interest 122, the region of interest request 123 may include location information, such as two-dimensional coordinate values, for the region of interest 122 within the frame. Additionally, the region of interest request 123 may also include a frame number that identifies the frame in which the region of interest 122 is included (Frame N). The region of interest request 123 may also indicate a respective identification number for the region of interest 122. The region of interest request 123 may also indicate one of a plurality of available transmission priorities (e.g., high priority or low priority) for the region of interest 122. Similar information may also be included for each other region of interest (if any) that may be identified in region of interest request 123.

As described above, low priority regions of interest may have a lower transmission priority than both high priority regions of interest and the plurality of low-resolution images. For example, in some cases, low priority regions of interest may be transmitted only when the HP ROI queue 251 has been emptied and when the object camera 100 has no existing un-transmitted down-sampled low-resolution images. As also described above, a relative transmission priority is user-selectable between high priority regions of interest and the plurality of low-resolution images. For example, the object camera 100 may have a setting that allows selection of a first option to transmit LR images prior to HP ROI's or selection of a second option to transmit HP ROI's (e.g., to empty the HP ROI queue 251) prior to transmitting LR images.

As also described above, the one or more regions of interest may comprise at least a first region of interest from a first high-resolution image that is included in the plurality of high-resolution images that are down-sampled (an external frame). For example, in FIG. 8, ROI 851 is transmitted for Frame N, which is an external frame. Also, the one or more regions of interest may further comprise at least a second region of interest from a second high-resolution image that is not included in the plurality of high-resolution images that are down-sampled (an internal frame). For example, in FIG. 8, ROI 852 is transmitted for Frame N+1, which is an internal frame. The first region of interest may have a first location, and the second region of interest has a second location. The second location may be determined based at least in part on the first location. For example, ROI 851 from Frame N is located in the center of Frame N. Additionally, ROI 852 from Frame N+1 is located towards the left side of Frame N+1. As described above, because the conveyor belt is moving from right to left in example 800, ROI 852 may be calculated as being towards the left side of Frame N+1 because ROI 851 is in the center of Frame N. The second location may be determined further based in part on a rate and/or a direction of movement of an object detected in the first region of interest. As described above, because the conveyor belt is moving from right to left in example 800, the object (barcode 801) is also moving from right to left with the speed at which the conveyor belt moves. Thus, the location of ROI 852 may be determined based in part on a rate and direction of movement of the barcode 801 (which may be the same as the rate and direction of movement of the conveyor belt). In some other examples, the second location may be determined further based in part on at least one of a rate or a direction of movement of the camera device. FIG. 10 shows an example 1000 in which object camera 100 may be moving, such as a result of being included in an autonomous vehicle that is moving. As described above, a location of a predicted ROI 1021 for Frame N+1 may be determined based on a location of ROI 1011 for Frame N as well as the direction and rate of movement of the object camera 100 (which may be the same as the rate and direction of movement of the autonomous vehicle).

As described above, in some examples, a camera device may include one or more image sensors that capture a high-resolution image of a frame, wherein the high-resolution image has a first resolution. The camera device may further include a circular storage buffer that stores the high-resolution image. The camera device may further include one or more processing components that down-sample the high-resolution image to a low-resolution image of the frame, wherein the low-resolution image has a second resolution that is lower than the first resolution. The camera device may perform operations comprising: transmitting, to an external compute node that is external to the camera device, the low-resolution image; receiving, from the external compute node, a request for a region of interest from the high-resolution image; obtaining the region of interest from the high-resolution image; and transmitting, to the external compute node, the region of interest from the high-resolution image.

As also described above, in some examples, a camera device may include one or more image sensors that capture, at a captured frame rate of the camera device, a plurality of high-resolution images of a plurality of frames, wherein the plurality of high-resolution images have a first resolution. The camera device may further include one or more memory components (e.g., a circular storage buffer) that store the high-resolution images. The camera device may further include one or more processing components that perform down-sampling, only for a subset of the plurality of frames, of a subset of the plurality of high-resolution images to a plurality of low-resolution images, wherein the plurality of low-resolution images have a second resolution that is lower than the first resolution, wherein the down-sampling is performed based on a selectable external frame rate of the camera device, and wherein the selectable external frame rate is decoupled from the captured frame rate. The camera device performs operations comprising: transmitting, to an external compute node that is external to the camera device, the plurality of low-resolution images; and transmitting, to the external compute node, based on one or more requests from the external compute node, one or more regions of interest from one or more of the plurality of high-resolution images.

Figure 14:
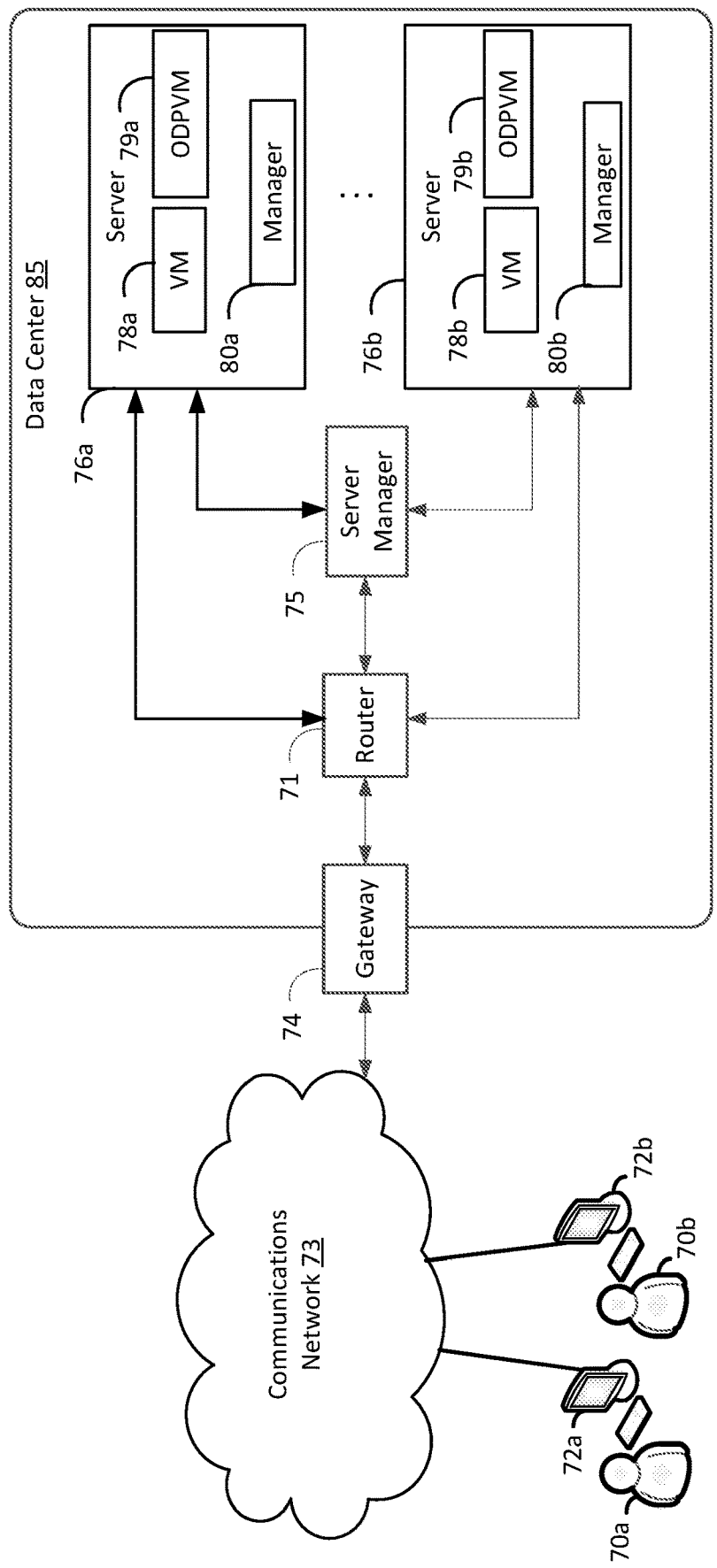
FIG. 14 is a diagram illustrating an example system for transmitting and providing data that may be used in accordance with the present disclosure.

An example system for transmitting and providing data will now be described in detail. In particular, FIG. 14 illustrates an example computing environment in which the embodiments described herein may be implemented. FIG. 14 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include object detection and processing virtual machines (ODPVM's) 79a-b, which are virtual machines that are configured to execute any, or all, of the object detection and/or object processing operations described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 14, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 14 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 14, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 14, a server manager 75 is also employed to at least in part direct various communications to, from and/or between servers 76a and 76b. While FIG. 14 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 14 has been greatly simplified and that many more networks and networking devices may be utilized to interconnect the various computing systems disclosed herein. These network topologies and devices should be apparent to those skilled in the art.

It should also be appreciated that data center 85 described in FIG. 14 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 15:
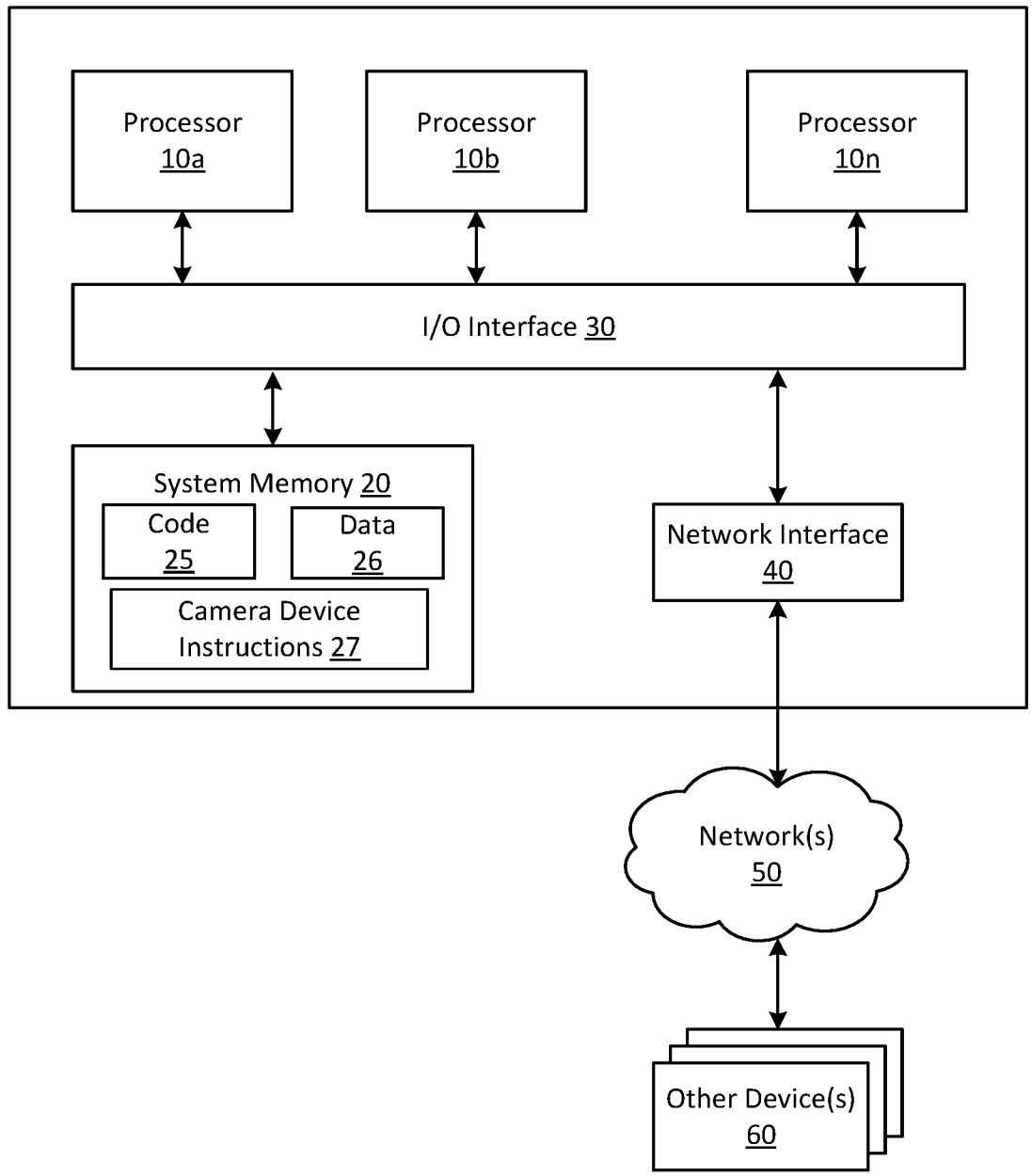
FIG. 15 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 15 depicts a computer system that includes or is configured to access one or more computer-accessible media. An object camera, such as object camera 100, may include a computing device 15 and/or one or more components thereof. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, when the system memory 20 is included in an object camera, system memory 20 may include camera device instructions 27, which are instructions for executing any, or all, of the operations of object camera 100 described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A camera device comprising:
one or more image sensors that capture, at a captured frame rate of the camera device, a plurality of high-resolution images of a plurality of frames, wherein the plurality of high-resolution images have a first resolution;
one or more memory components that store the high-resolution images;
one or more processing components that perform down-sampling, only for a subset of the plurality of frames, of a subset of the plurality of high-resolution images to a plurality of low-resolution images, wherein the plurality of low-resolution images have a second resolution that is lower than the first resolution, wherein the down-sampling is performed based on a selectable external frame rate of the camera device, and wherein the selectable external frame rate is decoupled from the captured frame rate;
wherein the camera device performs operations comprising:
transmitting, to an external compute node that is external to the camera device, the plurality of low-resolution images; and
transmitting, to the external compute node, based on one or more requests from the external compute node, one or more regions of interest from one or more of the plurality of high-resolution images, wherein the one or more requests from the external compute node indicate one of a plurality of available transmission priorities for each of the one or more regions of interest, wherein the plurality of available transmission priorities comprise a high priority and a low priority, and wherein the camera device is configurable to transmit low priority regions of interest only when there are no current available unsent low-resolution images and also no current queued high-priority regions of interest.

2. The camera device of claim 1, wherein the one or more regions of interest comprise at least a first region of interest from a first high-resolution image that is included in the plurality of high-resolution images that are down-sampled.

3. The camera device of claim 2, wherein the one or more regions of interest further comprise at least a second region of interest from a second high-resolution image that is not included in the plurality of high-resolution images that are down-sampled.

4. The camera device of claim 3, wherein the first region of interest has a first location, wherein the second region of interest has a second location, and wherein the second location is determined based at least in part on the first location.

5. The camera device of claim 4, wherein the second location is determined further based in part on at least one of a rate or a direction of movement of an object detected in the first region of interest.

6. The camera device of claim 4, wherein the second location is determined further based in part on at least one of a rate or a direction of movement of the camera device.

7. A computer-implemented method comprising:
capturing, by a camera device, at a captured frame rate of the camera device, a plurality of high-resolution images of a plurality of frames, wherein the plurality of high-resolution images have a first resolution;
down-sampling, by the camera device, only for a subset of the plurality of frames, a subset of the plurality of high-resolution images to a plurality of low-resolution images, wherein the plurality of low-resolution images have a second resolution that is lower than the first resolution;
transmitting, by the camera device, to an external compute node that is external to the camera device, the plurality of low-resolution images; and
transmitting, by the camera device, to the external compute node, based on one or more requests from the external compute node, one or more regions of interest from one or more of the plurality of high-resolution images, wherein the one or more requests from the external compute node indicate one of a plurality of available transmission priorities for each of the one or more regions of interest, wherein the plurality of available transmission priorities comprise a high priority and a low priority, and wherein the camera device is configurable to transmit low priority regions of interest only when there are no current available unsent low-resolution images and also no current queued high-priority regions of interest.

8. The computer-implemented method of claim 7, wherein the down-sampling and the transmitting of the plurality of low-resolution images are performed based on a selectable external frame rate of the camera device.

9. The computer-implemented method of claim 7, wherein the one or more regions of interest comprise at least a first region of interest from a first high-resolution image that is included in the plurality of high-resolution images that are down-sampled.

10. The computer-implemented method of claim 9, wherein the one or more regions of interest further comprise at least a second region of interest from a second high-resolution image that is not included in the plurality of high-resolution images that are down-sampled.

11. The computer-implemented method of claim 10, wherein the first region of interest has a first location, wherein the second region of interest has a second location, and wherein the second location is determined based at least in part on the first location.

12. The computer-implemented method of claim 11, wherein the second location is determined further based in part on at least one of a rate or a direction of movement of an object detected in the first region of interest.

13. The computer-implemented method of claim 11, wherein the second location is determined further based in part on at least one of a rate or a direction of movement of the camera device.

14. One or more non-transitory computer-readable storage media having stored thereon computing instructions that, upon execution by one or more computing devices, cause the one or more computing devices to perform operations comprising:
    capturing, by a camera device, at a captured frame rate of the camera device, a plurality of high-resolution images of a plurality of frames, wherein the plurality of high-resolution images have a first resolution;
    down-sampling, by the camera device, only for a subset of the plurality of frames, a subset of the plurality of high-resolution images to a plurality of low-resolution images, wherein the plurality of low-resolution images have a second resolution that is lower than the first resolution;
    transmitting, by the camera device, to an external compute node that is external to the camera device, the plurality of low-resolution images; and
    transmitting, by the camera device, to the external compute node, based on one or more requests from the external compute node, one or more regions of interest from one or more of the plurality of high-resolution images, wherein the one or more requests from the external compute node indicate one of a plurality of available transmission priorities for each of the one or more regions of interest, wherein the plurality of available transmission priorities comprise a high priority and a low priority, and wherein the camera device is configurable to transmit low priority regions of interest only when there are no current available unsent low-resolution images and also no current queued high-priority regions of interest.

15. The one or more non-transitory computer-readable storage media of claim 14, wherein the one or more regions of interest comprise at least a first region of interest from a first high-resolution image that is included in the plurality of high-resolution images that are down-sampled.

16. The one or more non-transitory computer-readable storage media of claim 15, wherein the one or more regions of interest further comprise at least a second region of interest from a second high-resolution image that is not included in the plurality of high-resolution images that are down-sampled.

17. The one or more non-transitory computer-readable storage media of claim 16, wherein the first region of interest has a first location, wherein the second region of interest has a second location, and wherein the second location is determined based at least in part on the first location.

18. The one or more non-transitory computer-readable storage media of claim 17, wherein the second location is determined further based in part on at least one of a rate or a direction of movement of an object detected in the first region of interest.

19. The one or more non-transitory computer-readable storage media of claim 17, wherein the second location is determined further based in part on at least one of a rate or a direction of movement of the camera device.

20. The one or more non-transitory computer-readable storage media of claim 14, wherein the down-sampling and the transmitting of the plurality of low-resolution images are performed based on a selectable external frame rate of the camera device.

* * * * *